United States Patent
Jidai et al.

(10) Patent No.: US 7,652,823 B2
(45) Date of Patent: Jan. 26, 2010

(54) NON-POLARIZING BEAM SPLITTER

(75) Inventors: Hidetaka Jidai, Sakai (JP); Iwao Usui, Kawachinagano (JP); Toshiya Kawanishi, Hashimoto (JP)

(73) Assignee: Konica Minolta Opto, Inc., Tokyo (JP)

( * ) Notice: Subject to any disclaimer, the term of this patent is extended or adjusted under 35 U.S.C. 154(b) by 145 days.

(21) Appl. No.: 11/545,707

(22) Filed: Oct. 10, 2006

(65) Prior Publication Data

US 2007/0086092 A1    Apr. 19, 2007

(30) Foreign Application Priority Data

Oct. 11, 2005    (JP) .............................. 2005-296068

(51) Int. Cl.
   G02B 27/14    (2006.01)
   G02B 1/10    (2006.01)
(52) U.S. Cl. .................. 359/629; 359/634; 359/636; 359/638; 359/580; 359/583; 359/585; 359/586; 359/587
(58) Field of Classification Search ......... 359/580–589, 359/629, 634, 636, 638
   See application file for complete search history.

(56) References Cited

U.S. PATENT DOCUMENTS

| | | | | |
|---|---|---|---|---|
| 2,750,832 A | * | 6/1956 | Morgan | 359/585 |
| 5,243,465 A | * | 9/1993 | Fein | 359/636 |
| 5,808,798 A | * | 9/1998 | Weber et al. | 359/583 |
| 2003/0081317 A1 | * | 5/2003 | Katsumata et al. | 359/566 |
| 2005/0063060 A1 | * | 3/2005 | Katsumata et al. | 359/566 |

FOREIGN PATENT DOCUMENTS

| | | |
|---|---|---|
| JP | 60-113203 | 6/1985 |
| JP | 61-011701 | 1/1986 |
| JP | 61011701 A * | 1/1986 |

* cited by examiner

Primary Examiner—Jessica T Stultz
Assistant Examiner—Mahidere S Sahle
(74) Attorney, Agent, or Firm—Brinks Hofer Gilson & Lione

(57) ABSTRACT

A non-polarizing beam splitter has a first prism; one or more ground layer(s) made of a dielectric material which is (are) formed on a slant face of the first right angle prism; an Au layer having thickness of 13 to 35 nm which is formed on the ground layer; one or more protective layer(s) made of a dielectric material which is (are) formed on the Au layer; and a second prism which is jointed to an outermost layer of the protective layer via adhesive. The non-polarizing beam splitter divides light at wavelength of 640 nm to 820 nm into transmission light and reflection light by a predetermined ratio.

13 Claims, 32 Drawing Sheets

1: FIRST RIGHT ANGLE PRISM
2: SECOND RIGHT ANGLE PRISM
3: GROUND LAYER(S)
4: AU LAYER
5: PROTECTIVE LAYER(S)
6: ADHESIVE

1: FIRST RIGHT ANGLE PRISM
2: SECOND RIGHT ANGLE PRISM
3: GROUND LAYER(S)
4: AU LAYER
5: PROTECTIVE LAYER(S)
6: ADHESIVE

| FIRST RIGHT ANGLE PRISM | |
|---|---|
| TiO$_2$ | 98.17 nm |
| M3 | 14.09 |
| Au | 22.23 |
| M3 | 34.68 |
| TiO$_2$ | 48.30 |
| SiO$_2$ | 75.46 |
| M3 | 126.14 |
| TiO$_2$ | 41.32 |
| SiO$_2$ | 70.88 |
| TiO$_2$ | 29.68 |
| ADHESIVE | |
| SECOND RIGHT ANGLE PRISM | |

GROUND LAYERS: TiO$_2$, M3, Au

PROTECTIVE LAYERS (TOTAL THICKNESS: 426.46nm)

FIG.39

| FIRST RIGHT ANGLE PRISM | |
|---|---|
| H4 | 104.71 nm |
| M3 | 25.84 |
| Au | 21.66 |
| M3 | 24.19 |
| H4 | 83.85 |
| SiO$_2$ | 78.08 |
| M3 | 110.69 |
| H4 | 55.78 |
| SiO$_2$ | 45.09 |
| H4 | 42.38 |
| ADHESIVE | |
| SECOND RIGHT ANGLE PRISM | |

GROUND LAYERS: H4, M3, Au

PROTECTIVE LAYERS (TOTAL THICKNESS: 440.06nm)

FIG.40

| FIRST RIGHT ANGLE PRISM | |
|---|---|
| H4 | 22.76 nm |
| SiO$_2$ | 62.92 |
| H4 | 62.44 |
| M3 | 125.64 |
| SiO$_2$ | 51.10 |
| M3 | 112.66 |
| Au | 21.73 |
| M3 | 20.00 |
| H4 | 107.84 |
| SiO$_2$ | 57.72 |
| M3 | 81.08 |
| H4 | 55.13 |
| SiO$_2$ | 29.78 |
| H4 | 49.85 |
| ADHESIVE | |
| SECOND RIGHT ANGLE PRISM | |

GROUND LAYERS (rows H4 through M3 112.66)

PROTECTIVE LAYERS (TOTAL THICKNESS: 401.4nm) (rows Au through H4 49.85)

FIG. 41

| FIRST RIGHT ANGLE PRISM | |
|---|---|
| H4 | 87.12 nm |
| M3 | 51.38 |
| Au | 20.50 |
| M3 | 50.35 |
| H4 | 55.23 |
| SiO₂ | 109.35 |
| M3 | 110.70 |
| H4 | 48.47 |
| SiO₂ | 46.32 |
| H4 | 42.70 |
| ADHESIVE | |
| SECOND RIGHT ANGLE PRISM | |

GROUND LAYERS (H4 87.12, M3 51.38)

PROTECTIVE LAYERS (TOTAL THICKNESS: 463.12nm)

FIG. 42

| FIRST RIGHT ANGLE PRISM | |
|---|---|
| H4 | 95.34 nm |
| Au | 23.30 |
| H4 | 89.57 |
| M3 | 154.38 |
| H4 | 63.42 |
| SiO₂ | 30.48 |
| H4 | 53.89 |
| ADHESIVE | |
| SECOND RIGHT ANGLE PRISM | |

GROUND LAYERS (H4 95.34)

PROTECTIVE LAYERS (TOTAL THICKNESS: 391.74nm)

FIG. 43

| FIRST RIGHT ANGLE PRISM | |
|---|---|
| H4 | 109. 83 nm |
| M3 | 28. 34 |
| Au | 14. 38 |
| M3 | 15. 17 |
| H4 | 94. 13 |
| SiO₂ | 88. 21 |
| M3 | 98. 28 |
| H4 | 44. 78 |
| SiO₂ | 61. 18 |
| H4 | 45. 14 |
| ADHESIVE | |
| SECOND RIGHT ANGLE PRISM | |

GROUND LAYERS (H4, M3)

PROTECTIVE LAYERS (TOTAL THICKNESS: 440.06nm)

FIG. 44

| FIRST RIGHT ANGLE PRISM | |
|---|---|
| H4 | 90.20 nm |
| M3 | 51.06 |
| Au | 13.50 |
| M3 | 46.65 |
| H4 | 57.93 |
| SiO₂ | 111.86 |
| M3 | 113.00 |
| H4 | 35.35 |
| SiO₂ | 55.86 |
| H4 | 45.80 |
| ADHESIVE | |
| SECOND RIGHT ANGLE PRISM | |

GROUND LAYERS (H4, M3)

PROTECTIVE LAYERS (TOTAL THICKNESS: 466.45nm)

FIG. 45

| FIRST RIGHT ANGLE PRISM | |
|---|---|
| H4 | 128.88 nm |
| Au | 15.50 |
| H4 | 114.32 |
| SiO₂ | 49.62 |
| M3 | 84.01 |
| H4 | 80.65 |
| SiO₂ | 49.82 |
| H4 | 45.20 |
| ADHESIVE | |
| SECOND RIGHT ANGLE PRISM | |

GROUND LAYERS (H4, Au)

PROTECTIVE LAYERS (TOTAL THICKNESS: 309.3nm)

FIG. 46

| FIRST RIGHT ANGLE PRISM | |
|---|---|
| H4 | 112.26 nm |
| M3 | 22.28 |
| Au | 18.02 |
| M3 | 14.64 |
| H4 | 96.50 |
| SiO2 | 81.53 |
| M3 | 98.92 |
| H4 | 51.80 |
| SiO2 | 55.63 |
| H4 | 45.37 |
| ADHESIVE | |
| SECOND RIGHT ANGLE PRISM | |

GROUND LAYERS (H4, M3, Au)

PROTECTIVE LAYERS (TOTAL THICKNESS: 444.39nm)

FIG. 47

| FIRST RIGHT ANGLE PRISM | |
|---|---|
| H4 | 115.58 nm |
| M3 | 12.40 |
| Au | 26.28 |
| M3 | 13.01 |
| H4 | 102.52 |
| SiO2 | 72.47 |
| M3 | 99.32 |
| H4 | 59.00 |
| SiO2 | 48.27 |
| H4 | 44.75 |
| ADHESIVE | |
| SECOND RIGHT ANGLE PRISM | |

GROUND LAYERS

PROTECTIVE LAYERS (TOTAL THICKNESS: 439.34nm)

FIG. 48

| FIRST RIGHT ANGLE PRISM | |
|---|---|
| H4 | 106. 93 nm |
| M3 | 15. 00 |
| Au | 31. 73 |
| M3 | 22. 70 |
| H4 | 95. 28 |
| SiO₂ | 70. 20 |
| M3 | 103. 00 |
| H4 | 59. 85 |
| SiO₂ | 44. 05 |
| H4 | 43. 57 |
| ADHESIVE | |
| SECOND RIGHT ANGLE PRISM | |

GROUND LAYERS (H4 106.93, M3 15.00, Au 31.73)

PROTECTIVE LAYERS (TOTAL THICKNESS: 438.65nm)

FIG. 49

| FIRST RIGHT ANGLE PRISM | |
|---|---|
| H4 | 96. 71 nm |
| M3 | 30. 00 |
| Au | 30. 70 |
| M3 | 47. 66 |
| H4 | 67. 34 |
| SiO₂ | 91. 18 |
| M3 | 109. 09 |
| H4 | 52. 01 |
| SiO₂ | 45. 14 |
| H4 | 43. 02 |
| ADHESIVE | |
| SECOND RIGHT ANGLE PRISM | |

GROUND LAYERS

PROTECTIVE LAYERS (TOTAL THICKNESS: 455.44nm)

FIG. 50

| FIRST RIGHT ANGLE PRISM | |
|---|---|
| H4 | 92.62 nm |
| M3 | 15.00 |
| Au | 33.30 |
| H4 | 116.52 |
| SiO₂ | 47.22 |
| M3 | 87.65 |
| H4 | 88.49 |
| SiO₂ | 25.48 |
| H4 | 49.17 |
| ADHESIVE | |
| SECOND RIGHT ANGLE PRISM | |

GROUND LAYERS (H4, M3)

PROTECTIVE LAYERS (TOTAL THICKNESS: 414.53nm)

FIG.51

| FIRST RIGHT ANGLE PRISM | |
|---|---|
| H4 | 106.70 nm |
| M3 | 68.35 |
| Au | 10.00 |
| M3 | 74.05 |
| H4 | 37.04 |
| SiO₂ | 104.51 |
| M3 | 140.84 |
| H4 | 41.74 |
| SiO₂ | 47.35 |
| H4 | 42.74 |
| ADHESIVE | |
| SECOND RIGHT ANGLE PRISM | |

GROUND LAYERS (H4 106.70, M3 68.35, Au 10.00)

PROTECTIVE LAYERS (TOTAL THICKNESS: 488.27nm)

FIG.52

| FIRST RIGHT ANGLE PRISM | |
|---|---|
| H4 | 61.13 nm |
| Au | 19.00 |
| H4 | 99.19 |
| SiO₂ | 121.90 |
| M3 | 229.09 |
| SiO₂ | 340.15 |
| ADHESIVE | |
| SECOND RIGHT ANGLE PRISM | |

GROUND LAYERS (H4 61.13, Au 19.00)

PROTECTIVE LAYERS (TOTAL THICKNESS: 790.33nm)

FIG.53

| FIRST RIGHT ANGLE PRISM | |
|---|---|
| H4 | 72.56 nm |
| M3 | 10.00 |
| Au | 27.00 |
| M3 | 10.00 |
| H4 | 93.24 |
| SiO2 | 84.02 |
| M3 | 52.42 |
| H4 | 67.80 |
| SiO2 | 10.00 |
| H4 | 89.18 |
| ADHESIVE | |
| SECOND RIGHT ANGLE PRISM | |

GROUND LAYERS (H4 72.56 nm, M3 10.00)

PROTECTIVE LAYERS (TOTAL THICKNESS: 406.66nm)

FIG.54

| FIRST RIGHT ANGLE PRISM | |
|---|---|
| H4 | 134.13 nm |
| M3 | 30.00 |
| Au | 26.00 |
| M3 | 76.46 |
| H4 | 45.20 |
| SiO₂ | 99.84 |
| M3 | 129.75 |
| H4 | 48.92 |
| SiO₂ | 51.03 |
| H4 | 34.38 |
| ADHESIVE | |
| SECOND RIGHT ANGLE PRISM | |

GROUND LAYERS (H4, M3)

PROTECTIVE LAYERS (TOTAL THICKNESS: 485.58nm)

FIG.55

| FIRST RIGHT ANGLE PRISM | |
|---|---|
| H4 | 75.21 nm |
| M3 | 15.00 |
| Au | 38.00 |
| H4 | 96.64 |
| SiO₂ | 159.15 |
| H4 | 228.44 |
| SiO₂ | 91.32 |
| H4 | 23.45 |
| ADHESIVE | |
| SECOND RIGHT ANGLE PRISM | |

GROUND LAYERS

PROTECTIVE LAYERS (TOTAL THICKNESS: 599nm)

FIG.56

| | Thickness of the Au layer D (nm) | Average Reflectance R (%) | Average Transmittance T (%) | X = R/(R+T) |
|---|---|---|---|---|
| Embodiment 1 | 22.23 | 46.9 | 47.2 | 0.499 |
| Embodiment 2 | 21.66 | 47.0 | 46.9 | 0.500 |
| Embodiment 3 | 21.73 | 46.8 | 47.4 | 0.497 |
| Embodiment 4 | 20.50 | 46.5 | 47.7 | 0.493 |
| Embodiment 5 | 23.30 | 47.5 | 45.3 | 0.511 |
| Embodiment 6 | 14.38 | 27.3 | 67.6 | 0.288 |
| Embodiment 7 | 13.50 | 26.9 | 68.2 | 0.283 |
| Embodiment 8 | 15.50 | 27.8 | 66.7 | 0.294 |
| Embodiment 9 | 18.02 | 37.2 | 57.2 | 0.394 |
| Embodiment 10 | 26.28 | 56.9 | 36.7 | 0.608 |
| Embodiment 11 | 31.73 | 67.3 | 26.2 | 0.720 |
| Embodiment 12 | 30.70 | 67.0 | 26.7 | 0.715 |
| Embodiment 13 | 33.30 | 67.8 | 25.2 | 0.729 |
| comparative example 1 | 10.00 | 23.6 | 72.5 | 0.246 |
| comparative example 2 | 19.00 | 31.1 | 62.8 | 0.331 |
| comparative example 3 | 17.00 | 43.6 | 51.3 | 0.460 |
| comparative example 4 | 26.00 | 64.2 | 30.3 | 0.679 |
| comparative example 5 | 38.00 | 71.0 | 21.9 | 0.765 |

FIG. 57

NON-POLARIZING BEAM SPLITTER

This application is based on the application No. 2005-296068 filed in Japan Oct. 11, 2005, the entire content of which is hereby incorporated by reference.

BACKGROUND OF THE INVENTION

1. Field of the Invention

The present invention relates to a non-polarizing beam splitter. More specifically, the invention relates to the non-polarizing beam splitter having an Au layer to be used in an optical device such as an optical pickup.

2. Description of the Related Art

Non-polarizing beam splitters branch incident light into transmission light and reflection light by a predetermined ratio regardless of a polarized light state, in a certain incident angle and wavelength. Such non-polarizing beam splitters can be manufactured by forming dielectric layers in a laminating manner, but dozens of dielectric layers should be laminated. For this reason, productivity is not good and it is technologically difficult to form dozens of layers with high accuracy. Further, it is difficult that reflectance is made to be approximately 50% or more by the laminated structure of the dielectric layers in a state that reflectance and transmittance of P polarized light and S polarized light are not changed.

Japanese Patent Application Laid-Open No. 60-113203, therefore, proposes a non-polarizing beam splitter where a first dielectric layer, an Ag layer and a second dielectric layer are formed on a slant face of a right angle prism and layer structures of the first dielectric layer and the second dielectric layer are symmetrical with respect to the Ag layer. Ag, however, easily corrodes, and thus it changes in quality due to water or the like to be used in the step of manufacturing non-polarizing beam splitters. For this reason, non-polarizing beam splitters using the Ag layer have a problem of decay durability.

On the other hand, Japanese Patent Application Laid-Open No. 61-11701 proposes a non-polarizing beam splitter using an Au layer instead of an Ag layer. Since Au is certainly a stable material which does not corrode, the problem of the decay durability is resolved. Since Au, however, is soft, it is easily scratched at the time of handling and machining. Au absorbs light in a visible light range, and it is used limitedly to the light in infrared regions in the non-polarizing beam splitter of Japanese Patent Application Laid-Open No. 61-11701.

The present invention is devised in view of such conventional problems, and its object is to provide a non-polarizing beam splitter using Au which prevents the Au layer from being scratched at the time of handing and machining, prevents peeling of the Au layer from a prism, and can cope with light in a visible range of wavelength of 640 nm to 820 nm to be used in DVD (wavelength: in the vicinity of 650 nm, 640 nm to 680 nm) and CD (wavelength: in the vicinity of 780 nm, 760 nm to 810 nm).

SUMMARY OF THE INVENTION

In order to achieve the above object, a non-polarizing beam splitter according to a first aspect of the present invention is characterized in that one or more ground layer(s) made of a dielectric material, an Au layer having a thickness of 13 nm to 35 nm and one or more protective layer(s) made of a dielectric material are sequentially laminated on a slant face of a first prism, an outermost layer of the protective layer is jointed to a slant face of a second prism, and the non-polarizing beam splitter divides light at wavelength of 640 nm to 820 nm into transmission light and reflection light by a predetermined ratio.

BRIEF DESCRIPTION OF THE DRAWINGS

These and other objects, advantages and features of the invention will become apparent from the following description thereof taken in conjunction with the preferred embodiments with the reference to the accompanying drawings in which:

FIG. 39 is a diagram schematically showing a layer structure of the first embodiment;

FIG. 40 is a diagram schematically showing a layer structure of the second embodiment;

FIG. 41 is a diagram schematically showing a layer structure of the third embodiment;

FIG. 42 is a diagram schematically showing a layer structure of the fourth embodiment;

FIG. 43 is a diagram schematically showing a layer structure of the fifth embodiment;

FIG. 44 is a diagram schematically showing a layer structure of the sixth embodiment;

FIG. 45 is a diagram schematically showing a layer structure of the seventh embodiment;

FIG. 46 is a diagram schematically showing a layer structure of the eighth embodiment;

FIG. 47 is a diagram schematically showing a layer structure of the ninth embodiment;

FIG. 48 is a diagram schematically showing a layer structure of the tenth embodiment;

FIG. 49 is a diagram schematically showing a layer structure of the eleventh embodiment;

FIG. 50 is a diagram schematically showing a layer structure of the twelfth embodiment;

FIG. 51 is a diagram schematically showing a layer structure of the thirteenth embodiment;

FIG. 52 is a diagram schematically showing a layer structure of the comparative example 1;

FIG. 53 is a diagram schematically showing a layer structure of the comparative example 2;

FIG. 54 is a diagram schematically showing a layer structure of the comparative example 3;

FIG. 55 is a diagram schematically showing a layer structure of the comparative example 4;

FIG. 56 is a diagram schematically showing a layer structure of the comparative example 5; and FIG. 57 is a table showing the thickness D of the Au layer, the average reflectance R, the average transmittance T and the reflectance ratio X=R/(R+T) calculated from the embodiments and the comparative examples.

DETAILED DESCRIPTION OF THE PREFERRED EMBODIMENTS

Figure 1:
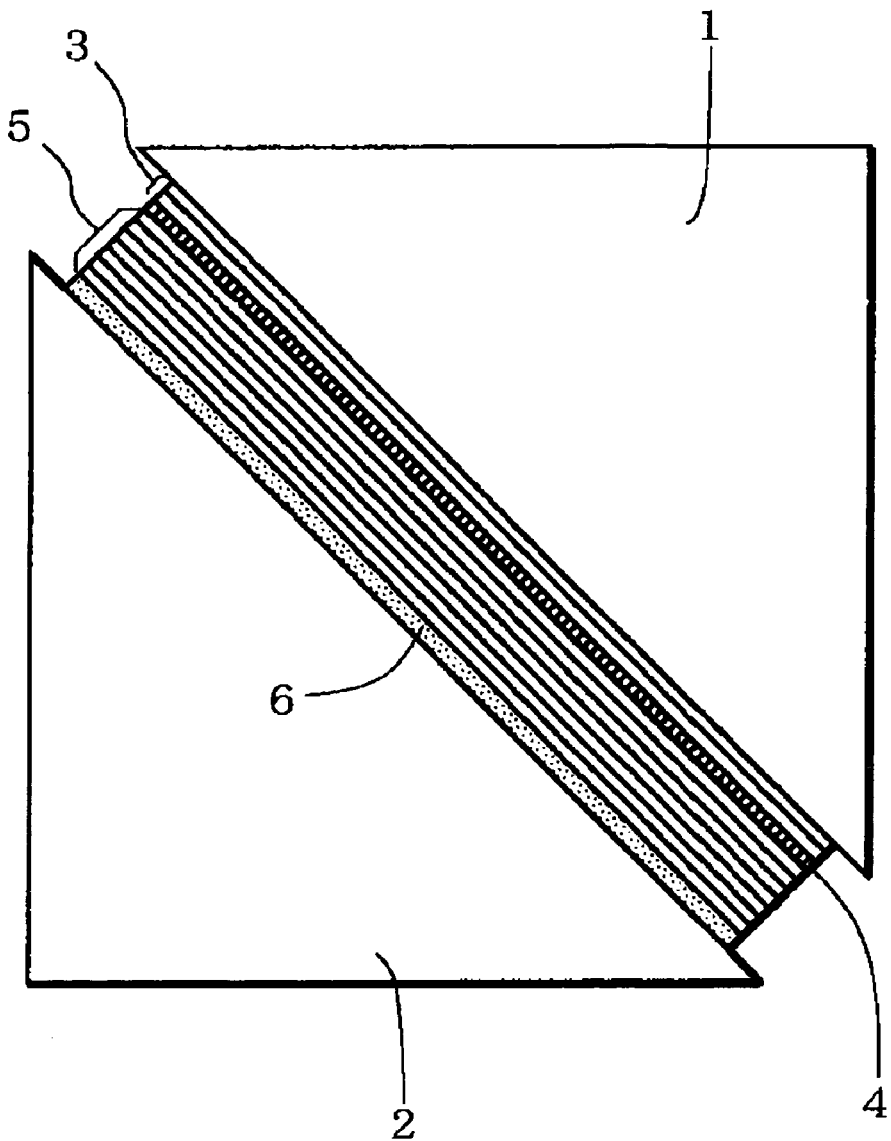
FIG. 1 is a schematic diagram illustrating a non-polarizing beam splitter according to one embodiment of the present invention.

One distinctive feature of a non-polarizing beam splitter of the present invention is that an Au layer is used in the non-polarizing beam splitter at wavelengths of 640 nm to 820 nm. Another distinctive feature of the non-polarizing beam splitter of the present invention is that one or more layered protective layer(s) made of a dielectric material is (are) provided onto the Au layer. When the protective layer is provided onto the Au layer, the Au layer is prevented from being scratched at the time of handling and machining. As mentioned later, since the Au layer has a predetermined thickness, even incident light in a visible range can be branched into transmission light and reflection light by a desired ratio regardless of a polarized light state.

The number of the protective layers to be formed is not particularly limited, but seven or more layers are desirable in order to protect the Au layer and simultaneously obtain desired optical characteristic. When a plurality of dielectric layers are formed, it is recommended as a layer structure that three kinds of dielectric layers: a layer having high refractive index of 1.8 or more, a layer having low refractive index of 1.5 or less, and a layer having intermediate refractive index 1.5 to 1.8 (not including 1.5 and 1.8) are laminated. The layer having intermediate refractive index is preferable as the dielectric layer adjacent to the Au layer. This is because when the dielectric layer adjacent to the Au layer is the layer having intermediate refractive index, the hardness of the entire protective layer can be improved. In addition, from the viewpoint of wear resistance, it is preferable that the total thickness of the protective layers is 400 nm or more.

Examples of the dielectric materials to be used for the protective layer are oxide such as $TiO_2$, $Ta_2O_5$, $La_2O_3$, $Al_2O_3$ and $SiO_2$ and mixture of them which are publicly known. In them, examples of a material having high refractive index of 1.8 or more are $TiO_2$ (refractive index: 2.13), mixture of $TiO_2$ and $La_2O_3$ ("Substance H4" made by Merck Ltd., Japan, refractive index: 1.80), and mixture of $TiO_2$ and $Ta_2O_5$ ("OA-600" made by Canon Optron Inc., refractive index: 1.97). Examples of a material having intermediate refractive index of 1.5 to 1.8 (not including 1.5 and 1.8) are $Al_2O_3$ (refractive index: 1.62) and mixture of $Al_2O_3$ and $La_2O_3$ ("Substance M3" made by Merck Ltd., Japan, refractive index: 1.73). Examples of a material having low refractive index of 1.5 or less are $SiO_2$ (refractive index: 1.45) and mixture of $SiO_2$ and $Al_2O_3$ ("Substance L5" made by Merck Ltd., Japan, refractive index: 1.48). The refractive indexes described here are applied to light with wavelength of 700 nm.

Another distinctive characteristic of the non-polarizing beam splitter of the present invention is that the thickness of Au layer is set within a range of 13 to 35 nm. When the thickness of the Au layer is set within such a range, absorption of the light including one in a visible range of 640 to 820 nm by the Au layer is suppressed to 10% or less which is small. When the thickness of the Au layer is thinner than 13 nm, the reflectance is deteriorated, and on the contrary when the thickness is thicker than 35 nm, the light absorption increases. The refractive index of Au is 0.13 in the light with wavelength of 700 nm, and its absorption coefficient is 3.84.

It is preferable that reflectance, transmittance, the ratio of reflectance to transmittance (reflectance ratio X), and the thickness of the Au layer satisfy the following expressions (1) and (2):

$$25.2X^2+12.4X+6.84<D<31.6X^2+12.6X+10.4, \quad (1)$$

$$R+T>88 \, (\%) \quad (2)$$

where,

X=R/(R+T);

R designates an average value of reflectance of P polarized light and reflectance of S polarized light at wavelength of 640 nm to 680 nm and wavelength of 760 nm to 810 nm;

T designates an average value of transmittance of the P polarized light and transmittance of the S polarized light at wavelength of 640 nm to 680 nm and wavelength of 760 nm to 810 nm; and D designates a thickness of the Au layer (nm).

The expression (1) is derived by a quadratic regression method based on data in embodiments and comparative examples and estimated values from the data, mentioned later. As a result, even the incident light in the visible range can be branched into transmission light and reflection light by a desired ratio regardless of a polarized light state. That is to say, when the thickness D of the Au layer is adjusted, the ratio of the reflectance to the transmittance in the non-polarizing beam splitter can be controlled.

Figure 38:
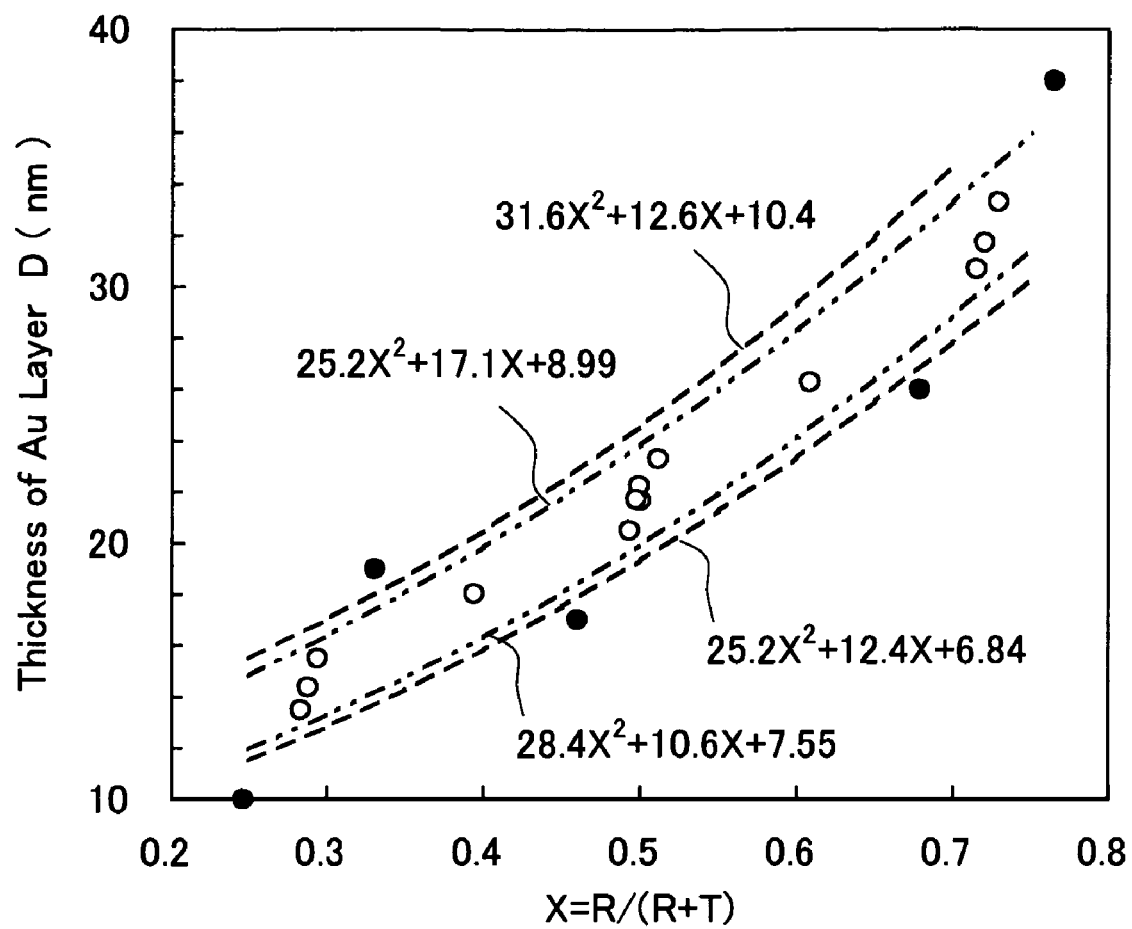
FIG. 38 is a graph showing a relationship between a reflectance ratio of the non-polarizing beam splitter and a thickness of an Au layer.

FIG. 38 illustrates a graph showing a relationship between the thickness D of the Au layer and the reflectance ratio X measured or calculated in the embodiments and comparative examples, mentioned later. As understood from the graph, when the desired reflectance ratio X is determined, a range of the thickness D (nm) of the Au layer is determined from a region sandwiched between two curved broken lines. As explained in the embodiments and comparative examples, mentioned later, when the thickness D is determined on the outside of the region sandwiched between two curved broken lines, desired reflectance R, transmittance T and reflectance ratio X (=R/(R+T)) of the P polarized light and the S polarized light cannot be stably obtained in the range of wavelength from 640 nm to 820 nm (comparative examples 1 to 5). According to the expression (1), for example, when the reflectance ratio is 0.5 (the ratio of the reflectance to the transmittance is 50:50), the thickness D of the Au layer is calculated as a range of 19.3 to 24.6 nm. For example, when the reflectance ratio X is 0.287 (the ratio of the reflectance to the transmittance is 27:67), the thickness D of the Au layer is calculated as a range of 12.5 to 16.6 nm, and on the contrary when the ratio X of the reflectance to the transmittance is 0.713 (the ratio of the reflectance to the transmittance is 67:27), the thickness D of the Au layer is calculated as a range of 28.5 to 35.4 nm.

Further, it is preferable that the thickness of the Au layer satisfy the following expression (1'):

$$28.4X^2+10.6X+7.55<D<25.2X^2+17.1X+8.99. \quad (1')$$

In a prism to be used in a pickup for DVD and CD, a maximum value of a difference |Rp−Rs| between the P polarized light reflectance Rp and the S polarized light reflectance Rs is preferably 10% or less at wavelength of 640 nm to 680 nm and at wavelength of 760 nm to 810 nm. More preferably, the difference (absolute value) is 6% or less. Similarly, a maximum value of a difference |Tp−Ts| between the P polarized light transmittance Tp and the S polarized light transmittance Ts is 10% or less at wavelength of 640 nm to 680 nm and at wavelength of 760 nm to 810 nm. More preferably, the difference (absolute value) is 6% or less.

A maximum value of a difference between reflectance $R_{640\_680}$ at wavelength of 640 nm to 680 nm and reflectance $R_{760\_810}$ at wavelength of 760 nm to 810 nm (both of them are average values of the P polarized light reflectance and the S polarized light reflectance) is preferably 10% or less. Similarly, a maximum value of a difference between transmittance $T_{640\_680}$ at wavelength of 640 nm to 680 nm and transmittance $T_{760\_810}$ at wavelength of 760 nm to 810 nm (both of them are average values of the P polarized light transmittance and the S polarized light transmittance) is preferably 10% or less. When the above conditions (1) and (2) are satisfied, the non-polarizing beam splitter which is the best for pickups for DVD and CD can be realized.

A distinctive characteristic of the non-polarizing beam splitter of the present invention is that one or more ground layer(s) made of a dielectric material is (are) formed between a slant face of a right angle prism and the Au layer. The formation of the ground layers effectively prevents peeling of the Au layer from the right angle prism, and further due to the thickness of the Au layer, even the incident light in a visible range can be branched into the transmission light and the reflection light by the same ratio regardless of the polarized light state.

The number of the ground layers to be formed is not particularly limited, but two or more layers are preferable from the viewpoint that adhesion between the prism and the Au layer is improved and the optical characteristic is improved. As the dielectric material to be used for the ground layer, the examples of the protective layer can be used. Further, similarly to the case of the protective layer, a layer having intermediate refractive index is preferable as the dielectric layer adjacent to the Au layer. This is because when the dielectric layer adjacent to the Au layer is the layer having intermediate refractive index, hardness of the entire ground layers can be improved.

Vacuum deposition without heating is desirable as the method of forming the Au layer. This is because when heating of 150° C. or more is carried out, the reflectance of the Au layer is deteriorated. On the other hand, the vacuum deposition without heating may be used as the method of forming the respective dielectric layers according to the method of forming the Au layer, but when the dielectric layers are formed by the vacuum deposition without heating, strength is decreased. For this reason, it is recommended that the dielectric layers are formed by using an IAD (Ion Assisted Deposition) method which can form layers precisely. As a result, decay durability of the dielectric layers is improved.

Adhesive having the approximately same refractive index as that of the right angle prism is preferably used as adhesive used in the present invention. In consideration of productivity or the like, ultraviolet cured adhesive, visible light cured adhesive and thermal cured adhesive are recommended.

EMBODIMENTS

First Embodiment

Figure 2:
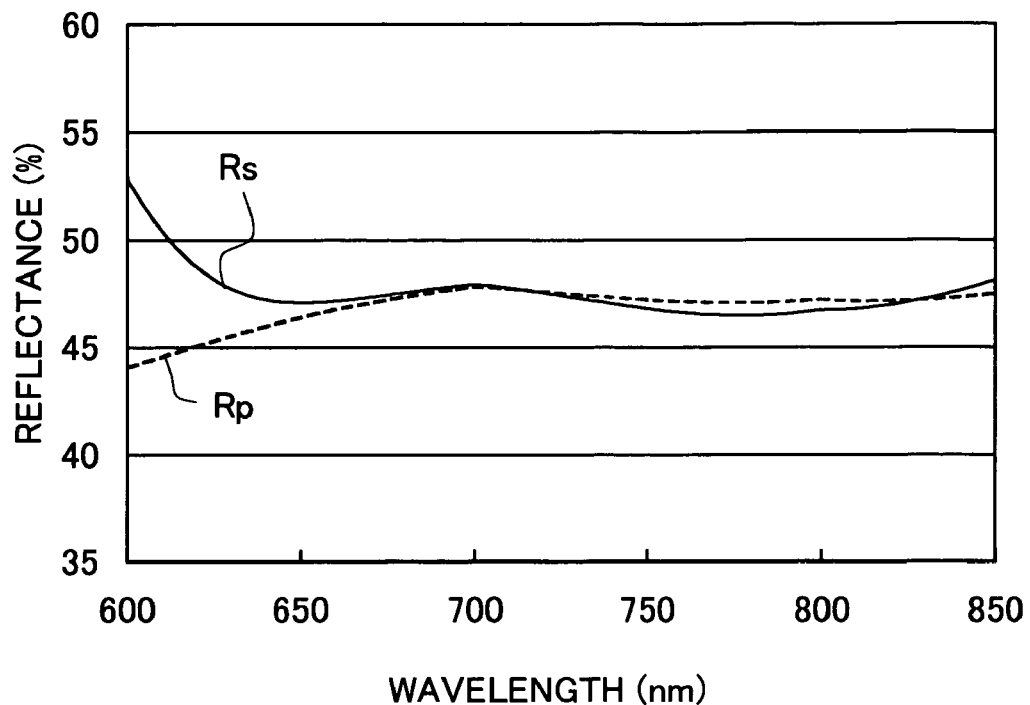
FIG. 2 is a graph showing reflectance of the non-polarizing beam splitter in a first embodiment.
Figure 3:
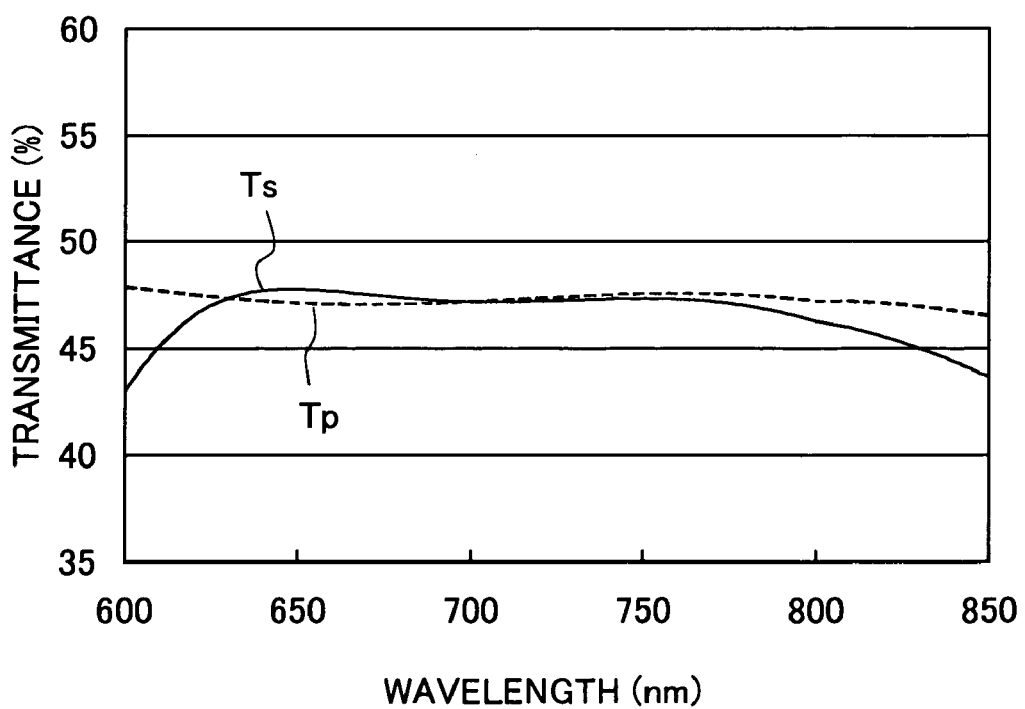
FIG. 3 is a graph showing transmittance of the non-polarizing beam splitter in the first embodiment.

The ground layer, the Au layer and the protective layer shown in FIG. 39 are formed on the slant face of the right angle prism by using a vacuum deposition device ("BMC-800" made by SINCRON Co., Ltd.). As to a deposition condition, the degree of vacuum is $1.2 \times 10^{-3}$ Pa, a substrate is not heated, an electron beam method is used for heating of the dielectric material, and Au is heated by a resistance heating method. A slant face of a second right angle prism is jointed to an outermost layer of the protective layer by the adhesive so that the non-polarizing beam splitter is formed. FIG. 1 is a schematic constitutional diagram of the manufactured non-polarizing beam splitter. This non-polarizing beam splitter is designed so that the reflectance and the transmittance of the incident light at wavelength of 640 nm to 820 nm become about 50%. As to the manufactured non-polarizing beam splitter, an incident angle of the light with respect to the Au layer is set to 45°, so that the reflectance and the transmittance of the P polarized light and the S polarized light are measured. The measured results are shown in FIGS. 2 and 3. In FIG. 39, "M3" is mixture of Al2O3 and La2O3 ("Substance M3" made by Merck Ltd., Japan, refractive index: 1.73)

Similarly to the above manner, three samples where an optical laminated film is formed on the slant face of the right angle prism are produced. The slant face of the right angle prism formed with the optical laminated film is rubbed thirty times with strength of 5N by using paper cloth ("Dusper" made by OZU CORPORATION) impregnated with a solvent ("EE3310" made by OLYMPUS), and presence/non-presence and its degree of scratch on the surface are visually observed. As a result, no scratch is found on the optical layered film in the two samples. One or two scratches are found on the optical layered film in one sample, but they do not become a practical problem. When the protective layer is not provided, the Au layer is peeled.

Second Embodiment

This non-polarizing beam splitter is designed so that the reflectance and the transmittance of the incident light at wavelength of 640 nm to 820 nm become about 50%.

Figure 4:
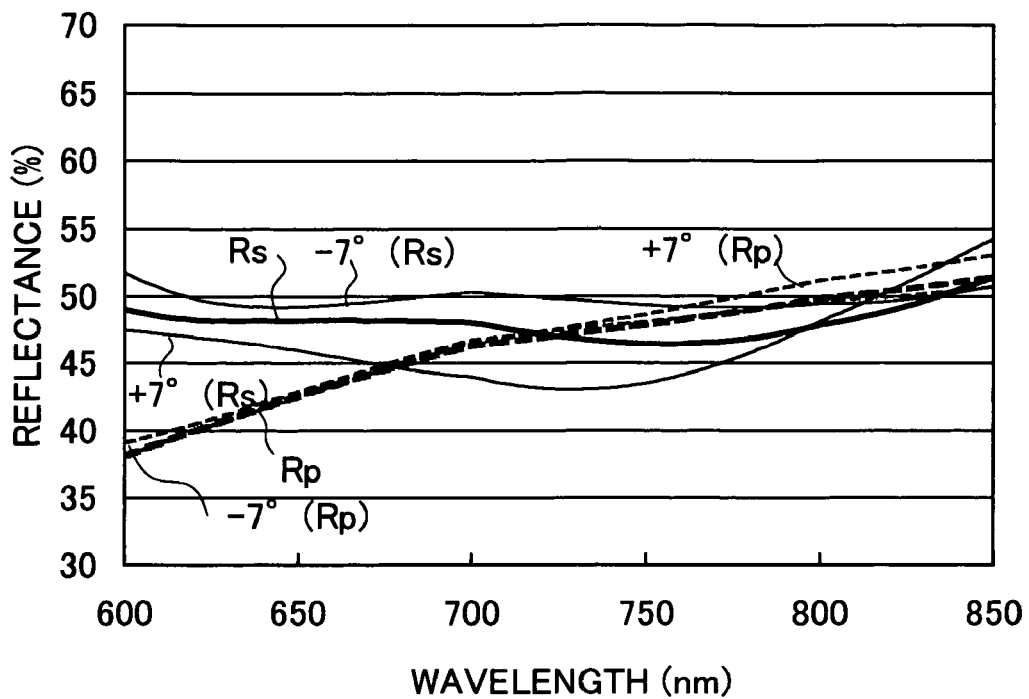
FIG. 4 is a graph showing reflectance of the non-polarizing beam splitter in a second embodiment.
Figure 5:
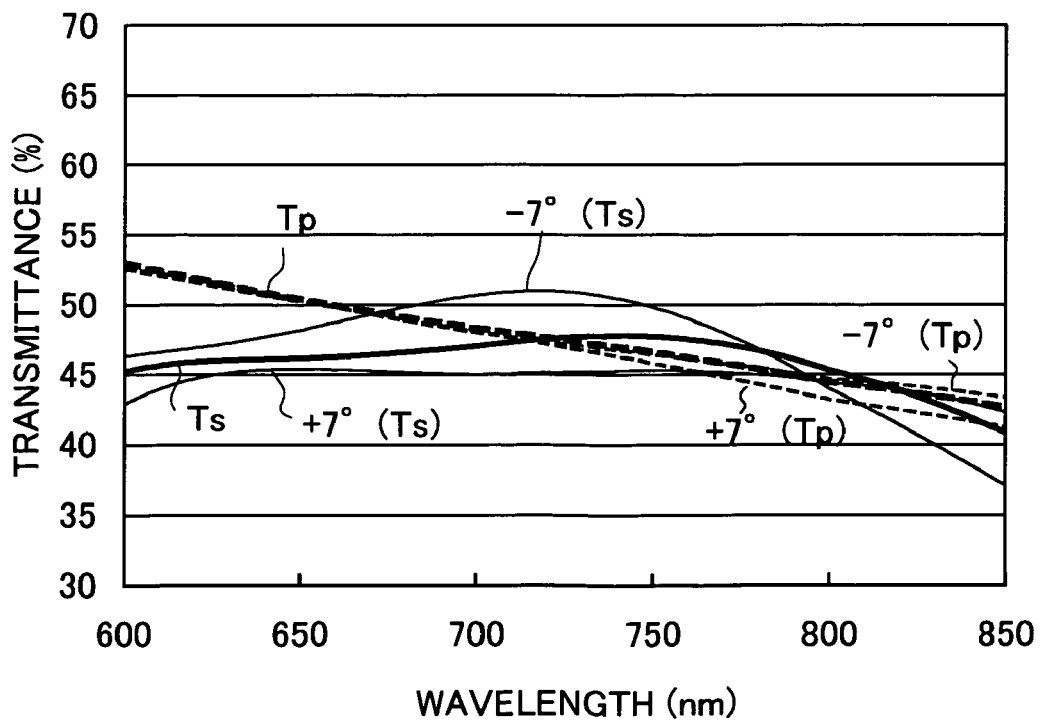
FIG. 5 is a graph showing transmittance of the non-polarizing beam splitter in the second embodiment.

Similarly to the first embodiment, after the ground layer, the Au layer and the protective layer shown in FIG. 40 are formed on the slant face of the right angle prism, the protective layer is jointed to a slant face of a second right angle prism by adhesive, so that the non-polarizing beam splitter is manufactured. As to this manufactured non-polarizing beam splitter, similarly to the first embodiment, the reflectance and the transmittance of the P polarized light and the S polarized light are measured. The incident angle of the light with respect to the Au layer is set to 45°±7° so that the reflectance and the transmittance of the P polarized light and the S polarized light are measured. The measured results are shown in FIGS. 4 and 5. In FIG. 40, "M3" is mixture of $Al_2O_3$ and $La_2O_3$ ("Substance M3" made by Merck Ltd., Japan, refractive index: 1.73), "H4" is mixture of $TiO_2$ and $La_2O_3$ ("Substance H4" made by Merck Ltd., Japan, refractive index: 1.80).

Third Embodiment

This non-polarizing beam splitter is designed so that the reflectance and the transmittance of the incident light at wavelength of 640 nm to 820 nm become about 50%.

Figure 6:
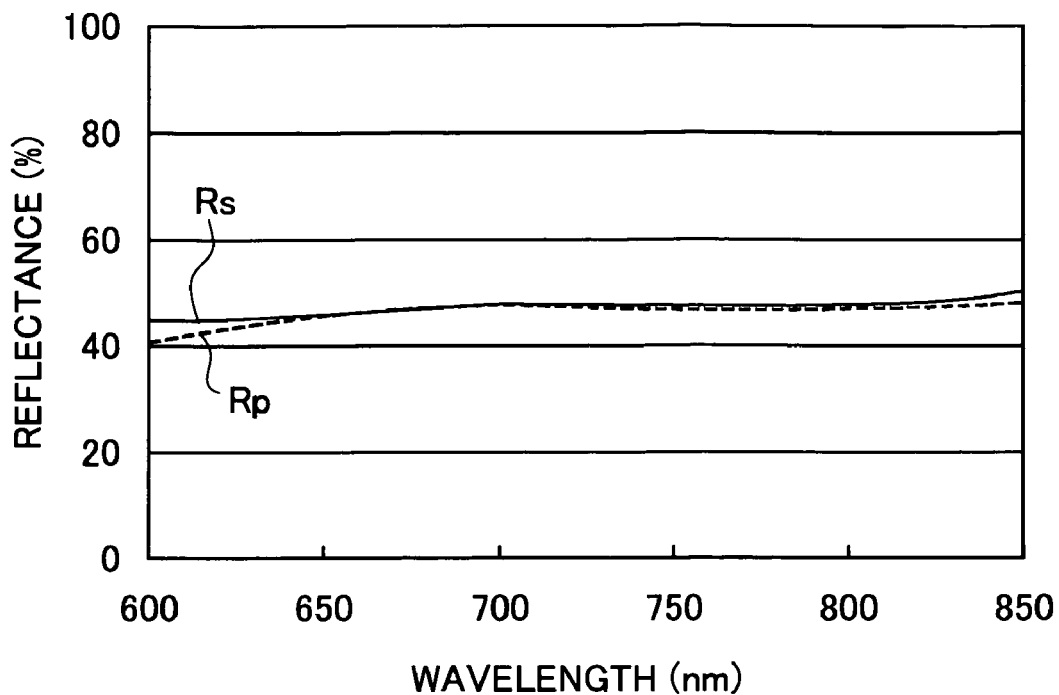
FIG. 6 is a graph showing reflectance of the non-polarizing beam splitter in a third embodiment.
Figure 7:
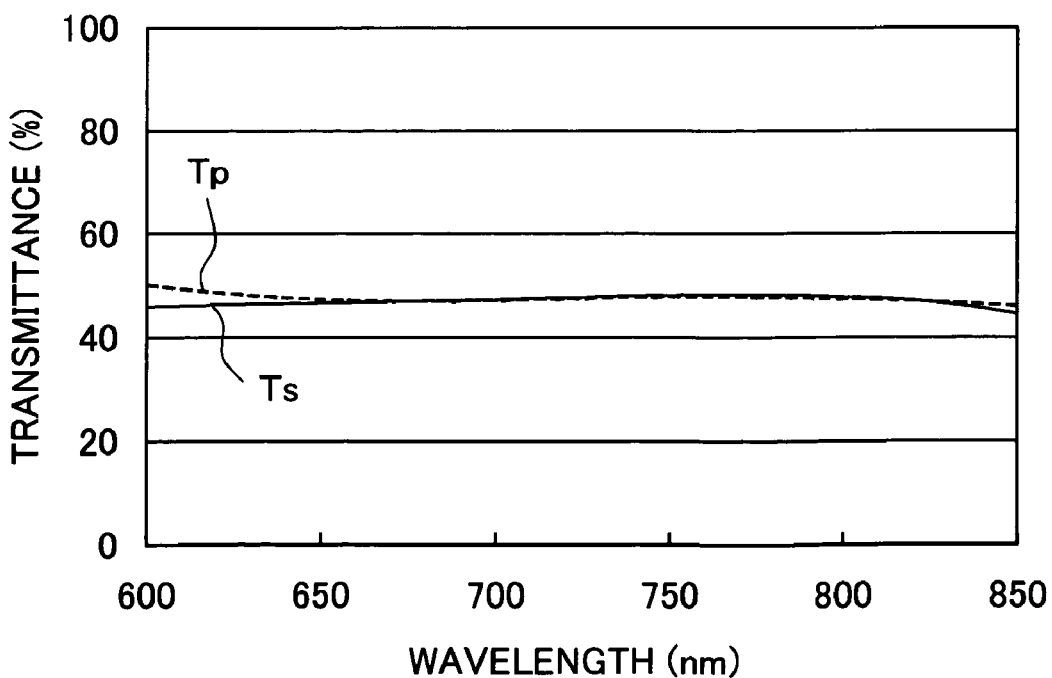
FIG. 7 is a graph showing transmittance of the non-polarizing beam splitter in the third embodiment.
Figure 8:
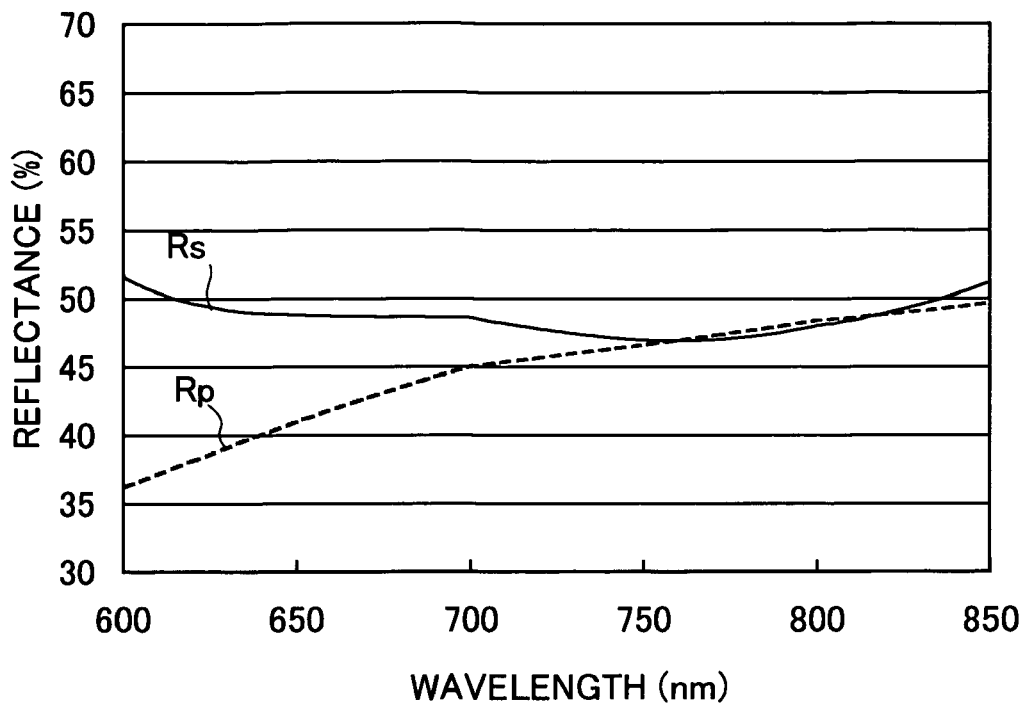
FIG. 8 is a graph showing reflectance of the non-polarizing beam splitter in a fourth embodiment.
Figure 9:
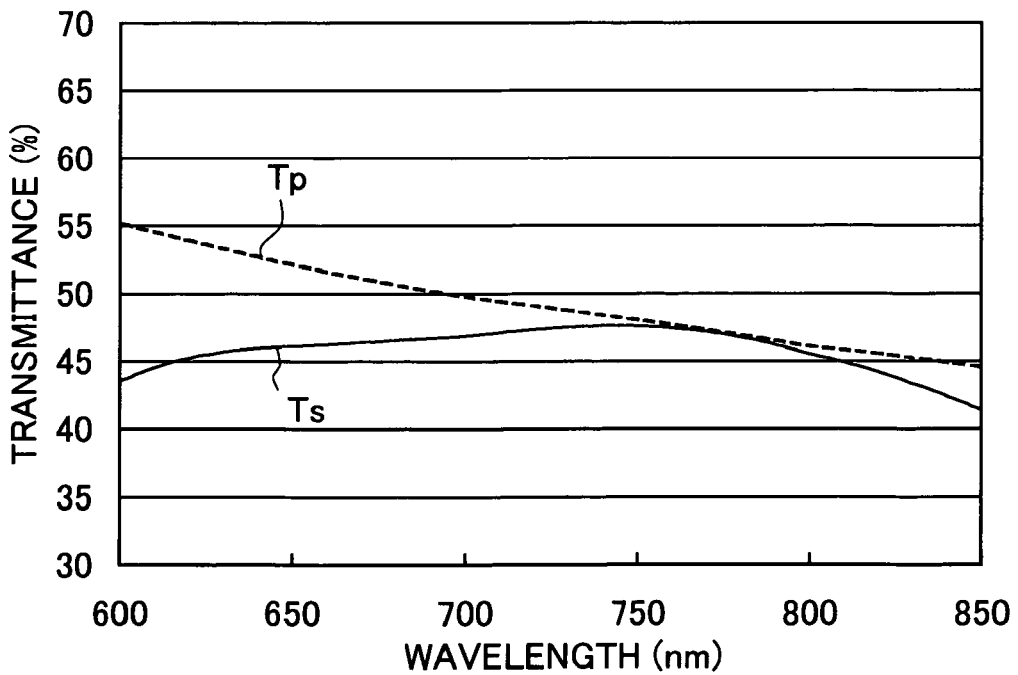
FIG. 9 is a graph showing transmittance of the non-polarizing beam splitter in the fourth embodiment.
Figure 10:
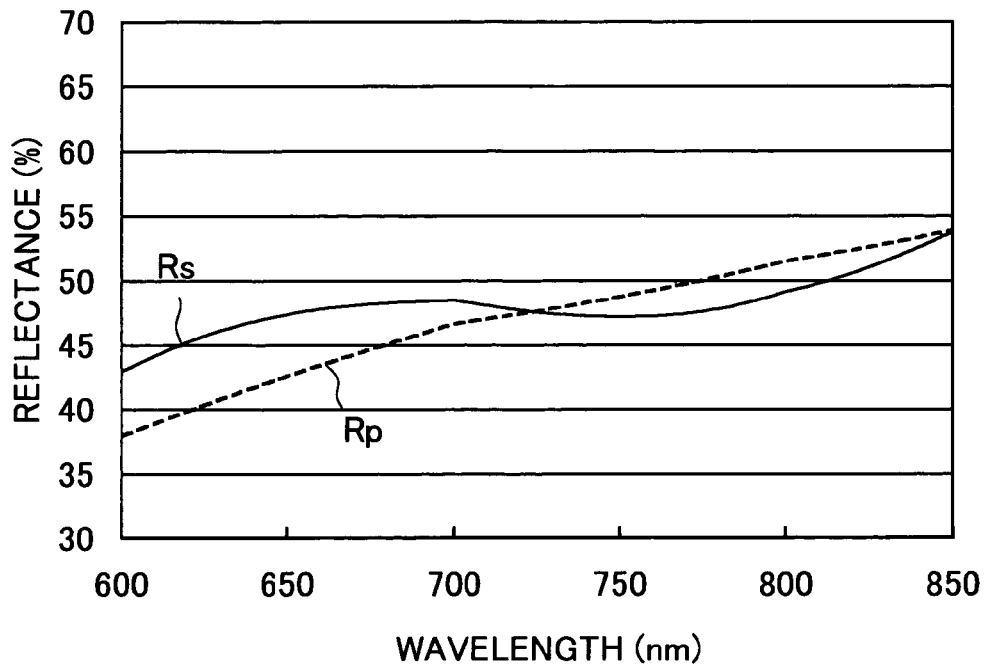
FIG. 10 is a graph showing reflectance of the non-polarizing beam splitter in a fifth embodiment.
Figure 11:
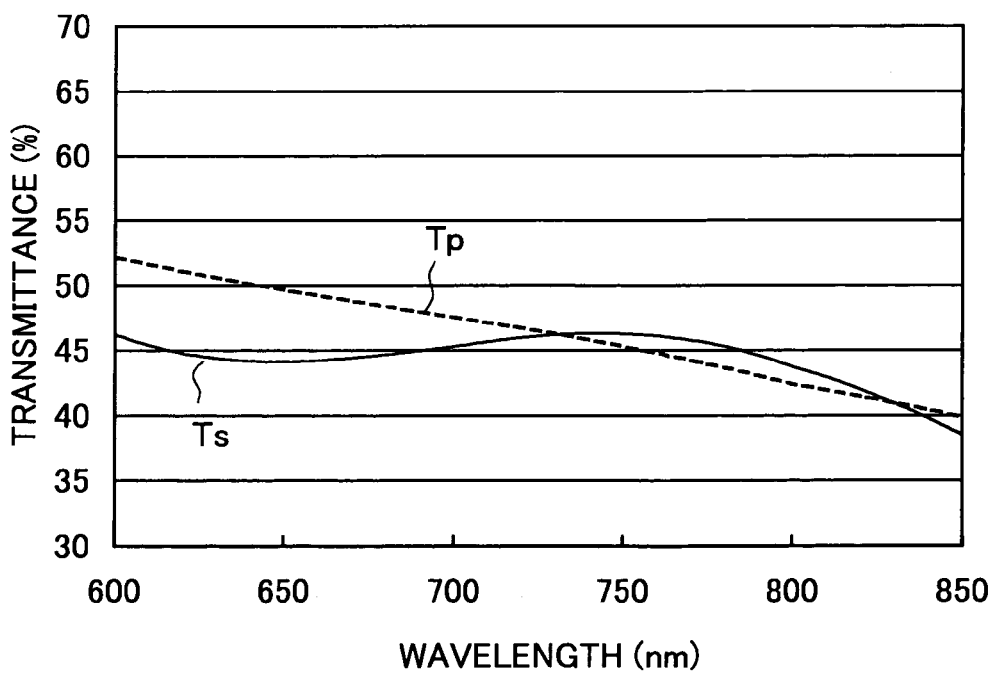
FIG. 11 is a graph showing transmittance of the non-polarizing beam splitter in the fifth embodiment.
Figure 12:
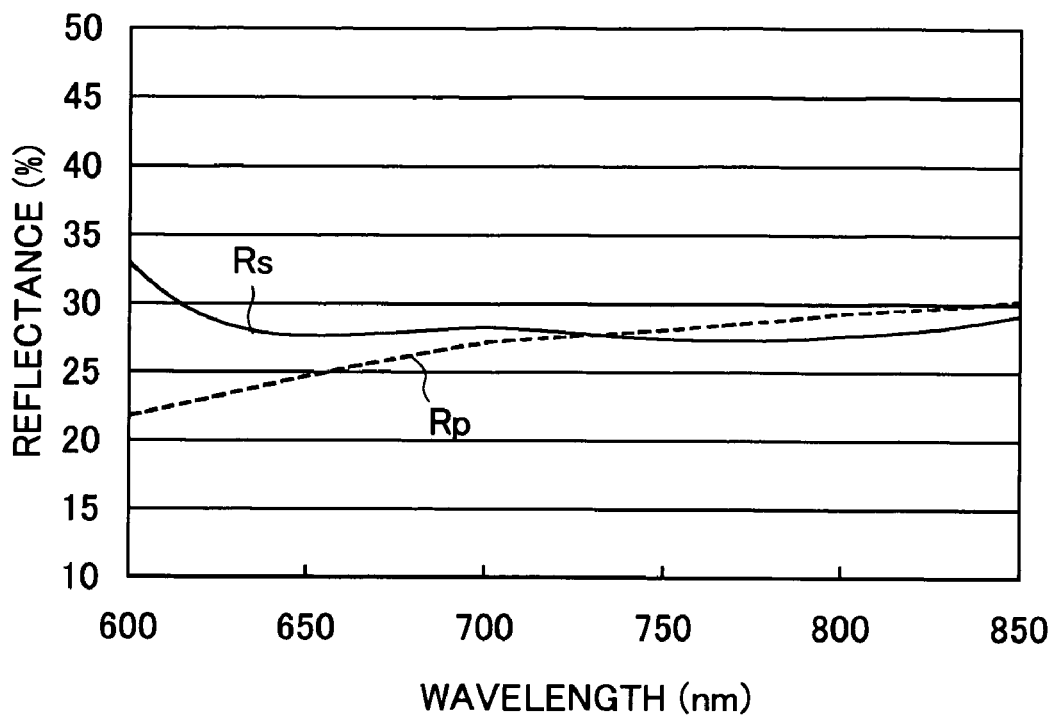
FIG. 12 is a graph showing reflectance of the non-polarizing beam splitter in a sixth embodiment.
Figure 13:
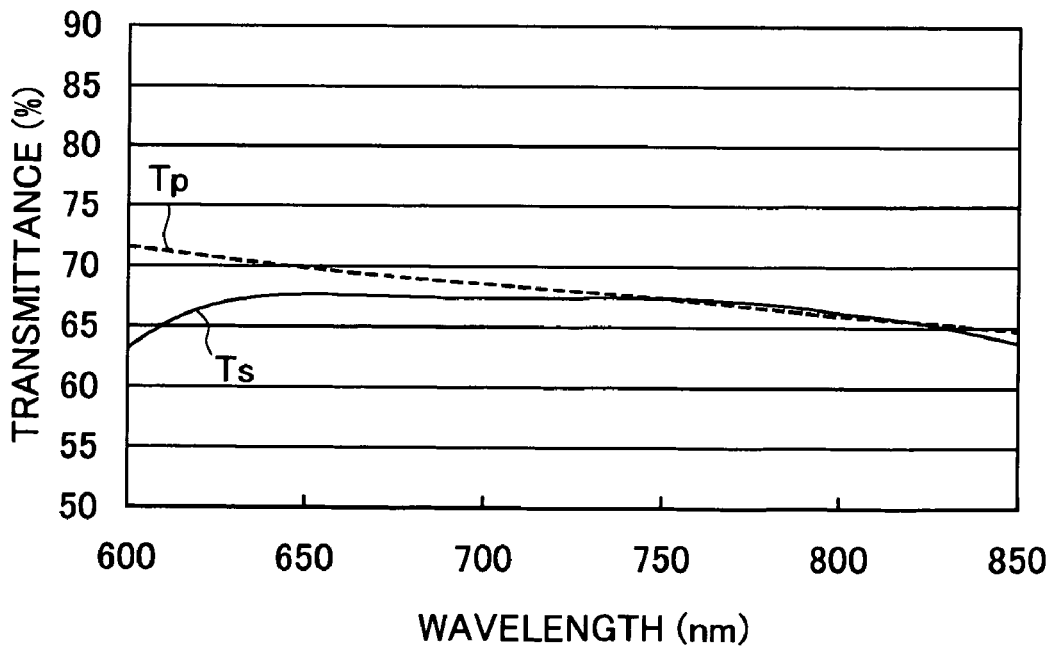
FIG. 13 is a graph showing transmittance of the non-polarizing beam splitter in the sixth embodiment.
Figure 14:
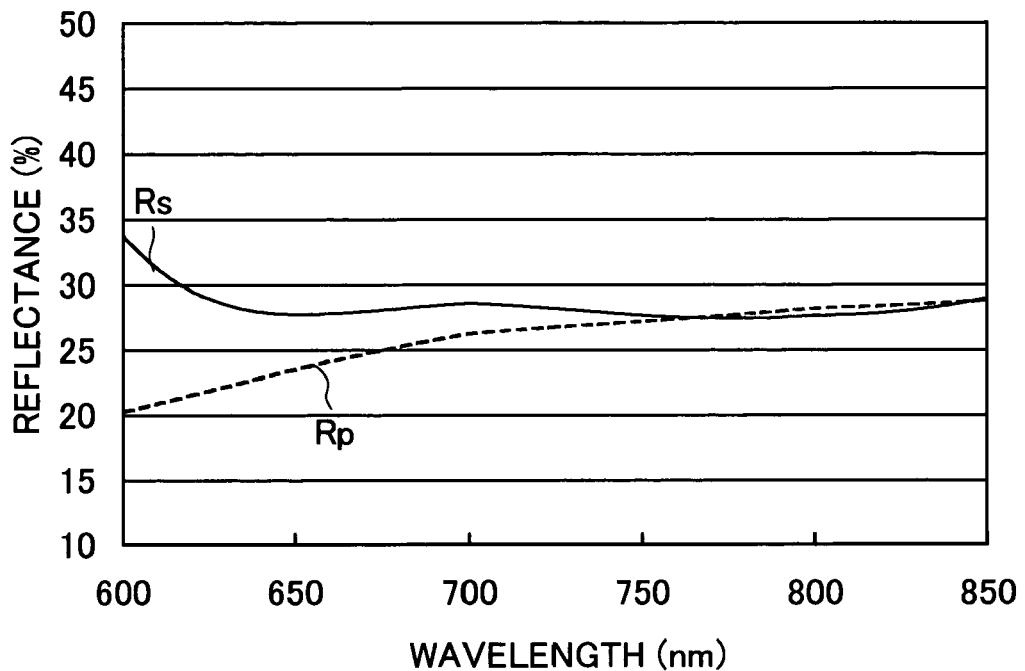
FIG. 14 is a graph showing reflectance of the non-polarizing beam splitter in a seventh embodiment.
Figure 15:
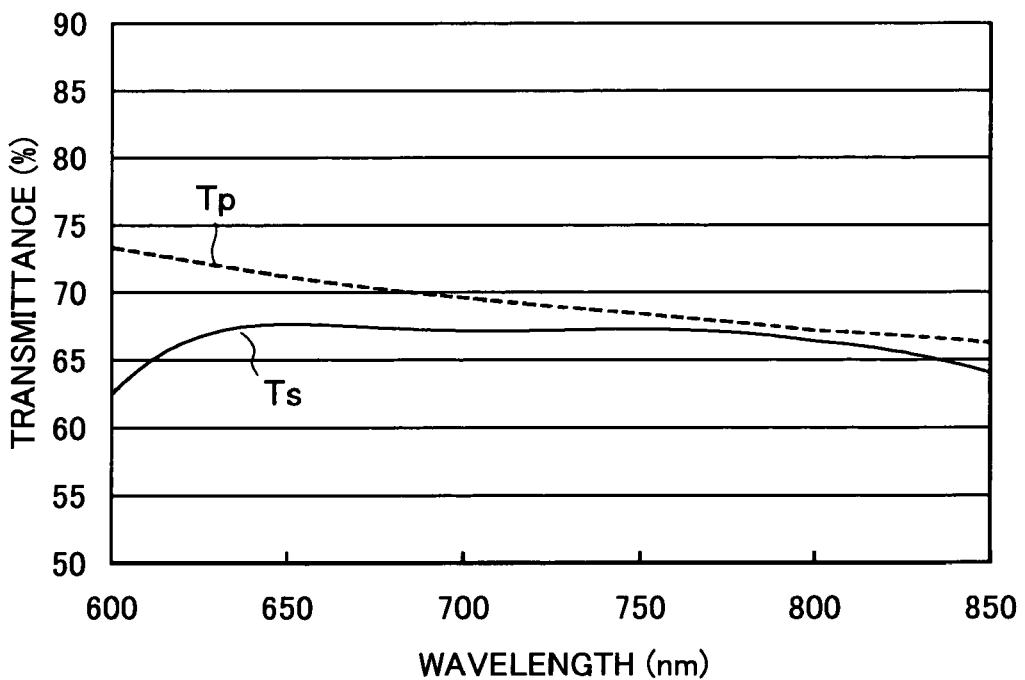
FIG. 15 is a graph showing transmittance of the non-polarizing beam splitter in the seventh embodiment.
Figure 16:
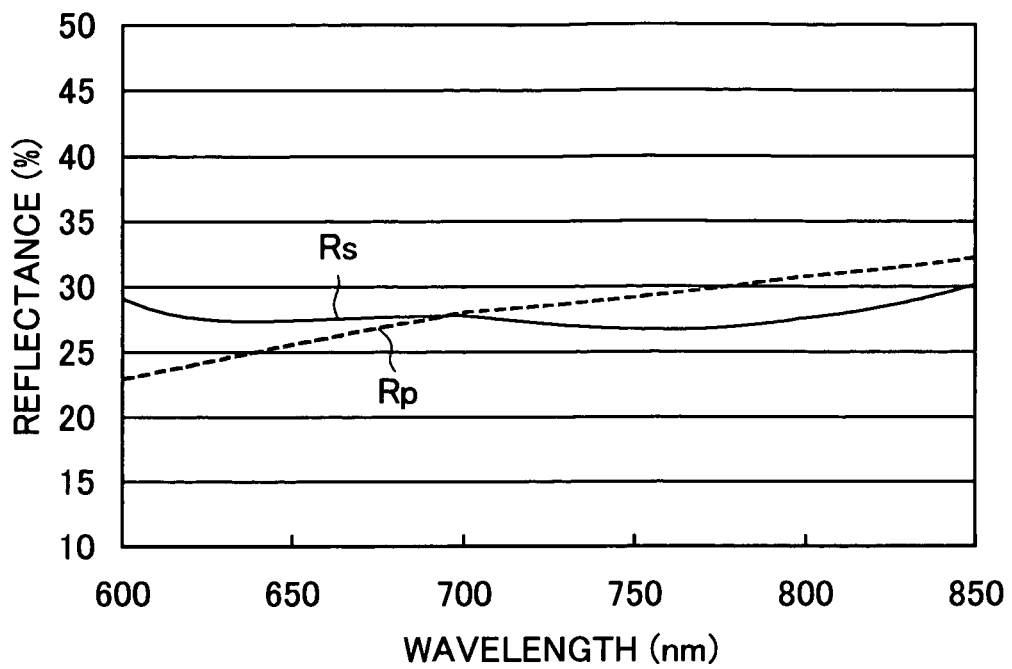
FIG. 16 is a graph showing reflectance of the non-polarizing beam splitter in an eighth embodiment.
Figure 17:
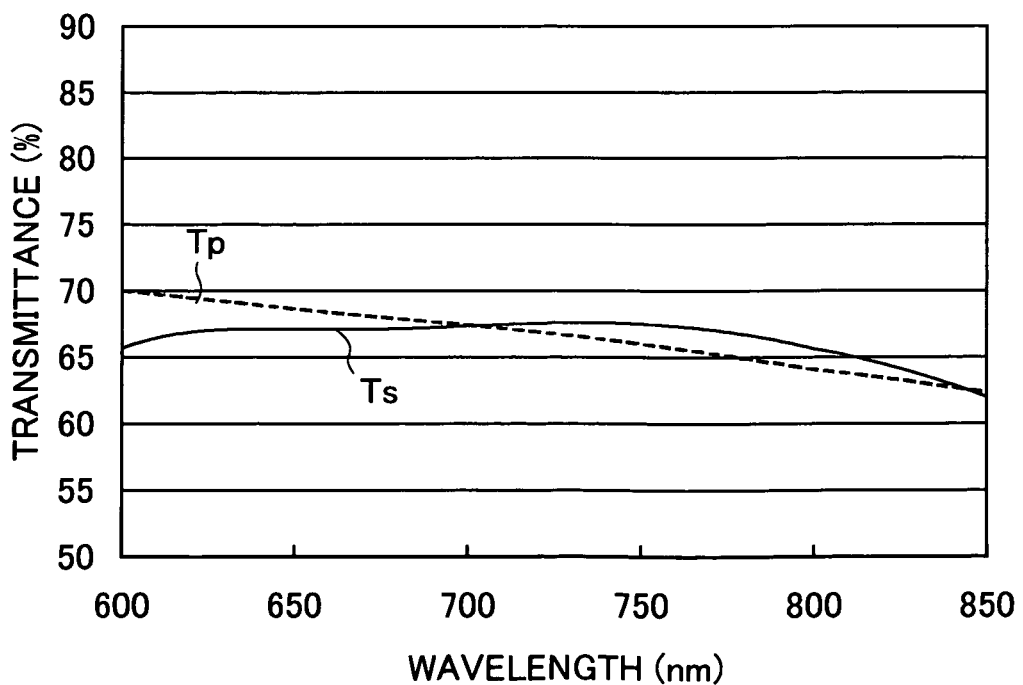
FIG. 17 a graph showing transmittance of the non-polarizing beam splitter in the eighth embodiment.

Similarly to the first embodiment, after the ground layer, the Au layer and the protective layer shown in FIG. 41 are formed on the slant face of the first right angle prism, the protective layer is jointed to the slant face of the second right angle prism by adhesive, so that the non-polarizing beam splitter is manufactured. As to this manufactured non-polarizing beam splitter, similarly to the first embodiment, the reflectance and the transmittance of the P polarized light and the S polarized light are measured. The measured results are shown in FIGS. 6 and 7.

Similarly to the third embodiment, three samples where the optical laminated film is formed on the slant face of the right angle prism are manufactured, and the rubbing resistant test of the first embodiment is conducted. As a result, no scratch is found on the optical laminated film in the two samples. One or two scratches are found on the optical layered film in one sample, but they are not become a practical problem.

Fourth and Fifth Embodiments

This non-polarizing beam splitter is designed so that the reflectance and the transmittance of the incident light at wavelength of 640 nm to 820 nm become about 50%, and the thickness of the Au layer, the ground layer and the protective layer in the first to third embodiments are changed. The layer structure of the Fourth and Fifth embodiments are shown in FIGS. 42 and 43, respectively. FIGS. 8 to 11 show calculated results of the reflectance and the transmittance of the P polarized light and the S polarized light.

Sixth to Eighth Embodiments

This non-polarizing beam splitter is designed so that the reflectance and the transmittance of the incident light at wavelength of 640 nm to 820 nm become about 30% and 70%, respectively. FIGS. 12 to 17 show calculated results of the reflectance and the transmittance of the P polarized light and the S polarized light. The layer structure of the sixth to eighth embodiments are shown in FIG. 44 to 46.

Ninth Embodiment

Figure 18:
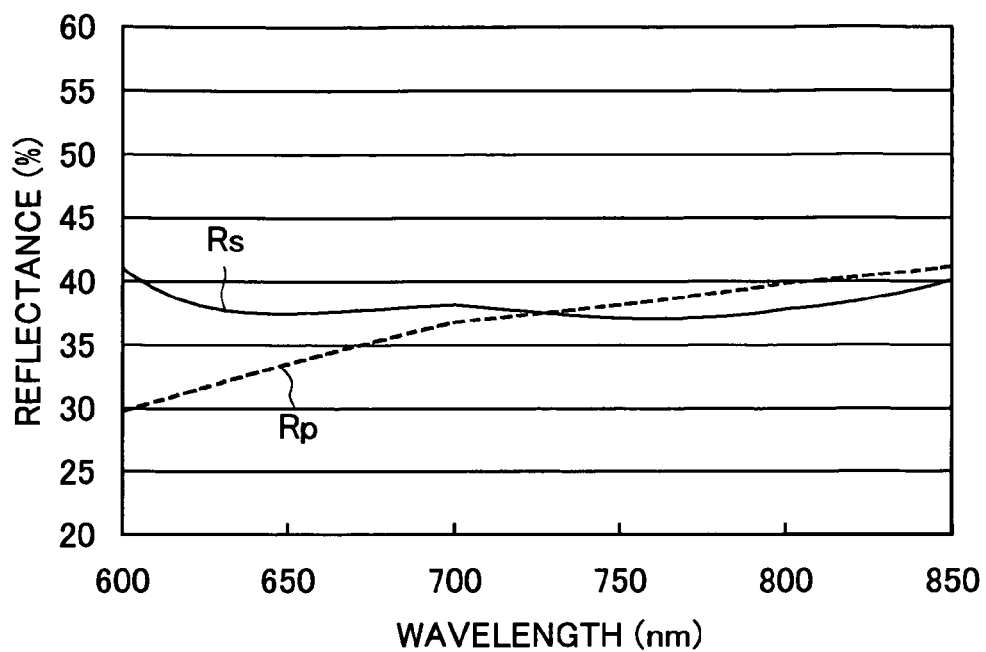
FIG. 18 is a graph showing reflectance of the non-polarizing beam splitter in a ninth embodiment.
Figure 19:
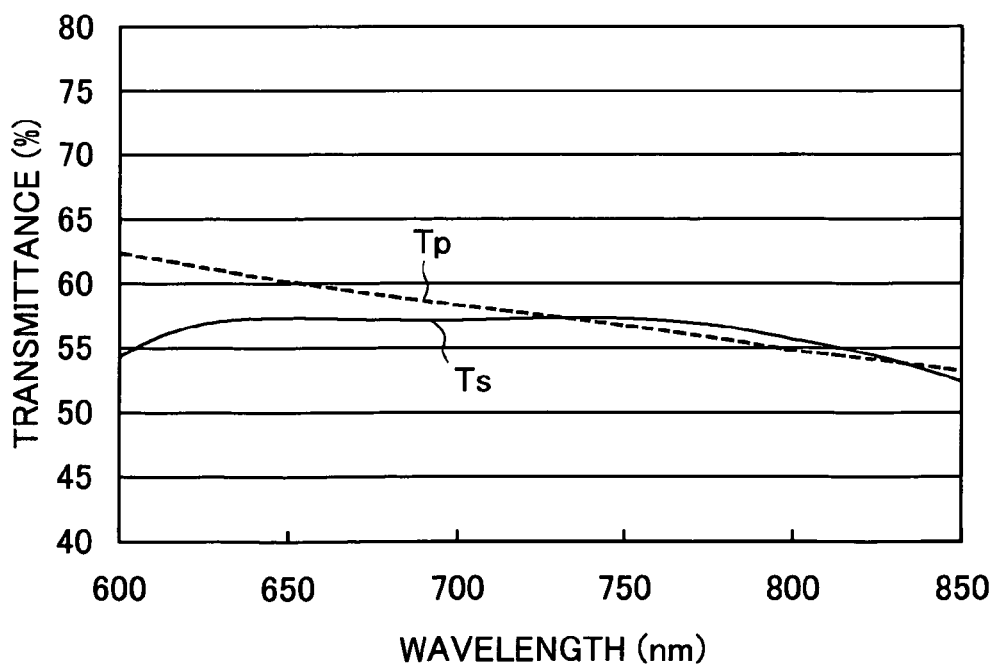
FIG. 19 is a graph showing transmittance of the non-polarizing beam splitter in the ninth embodiment.

This non-polarizing beam splitter is designed so that the reflectance and the transmittance of the incident light at wavelength of 640 nm to 820 nm become about 40% and 60%, respectively. FIGS. 18 and 19 show calculated results of the reflectance and the transmittance of the P polarized light and the S polarized light. The layer structure of the ninth embodiment is shown in FIG. 47.

Tenth Embodiment

Figure 20:
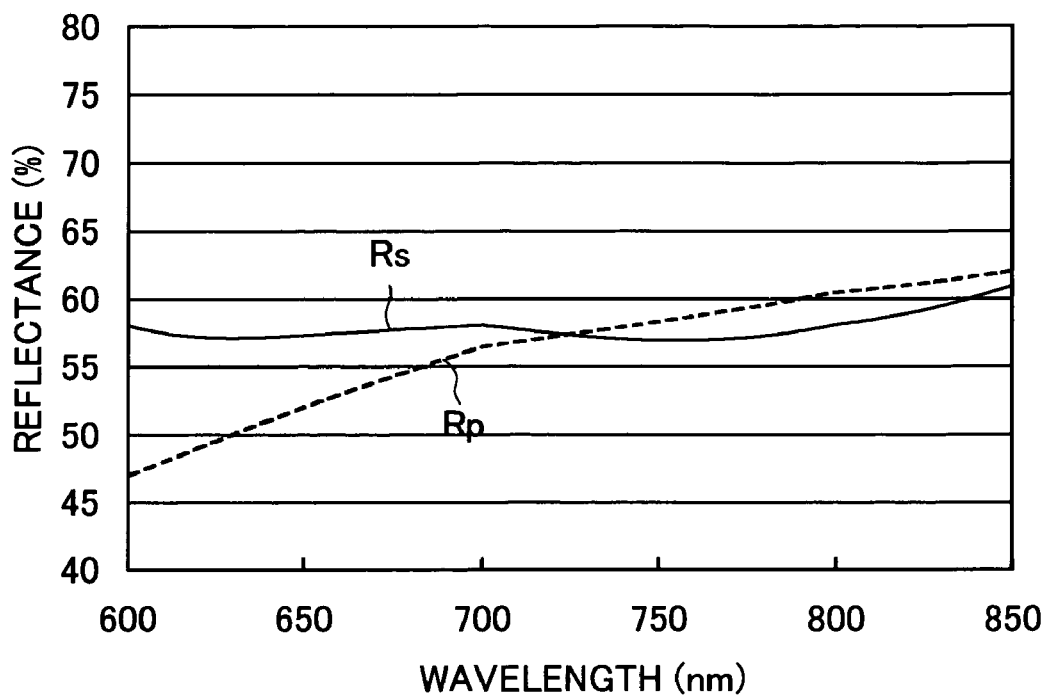
FIG. 20 is a graph showing reflectance of the non-polarizing beam splitter in a tenth embodiment.
Figure 21:
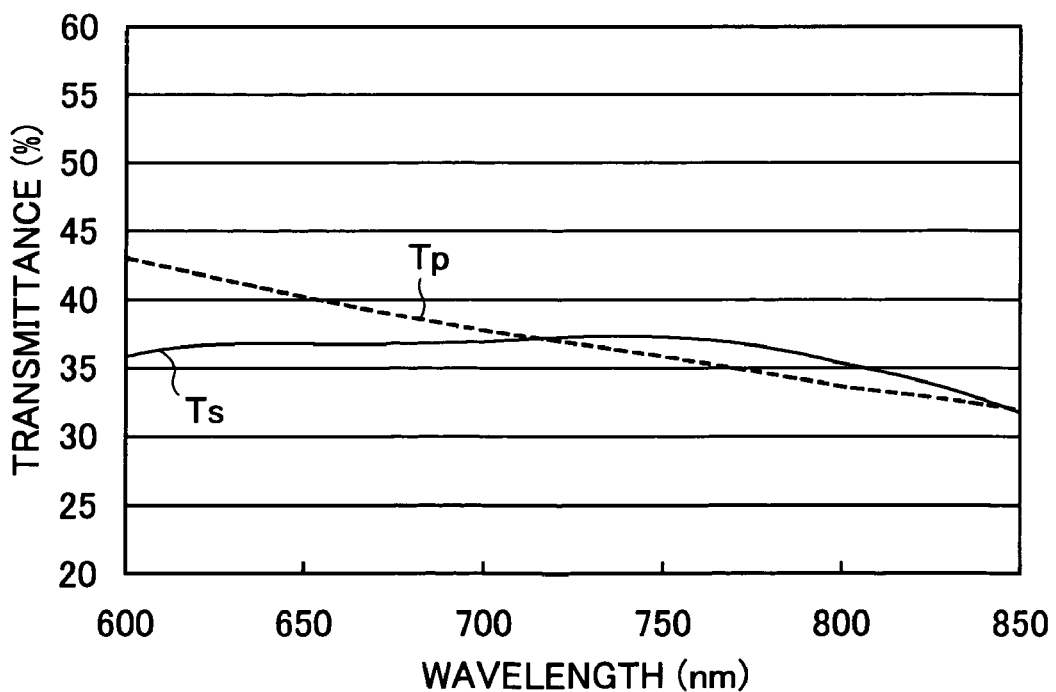
FIG. 21 is a graph showing transmittance of the non-polarizing beam splitter in the tenth embodiment.
Figure 22:
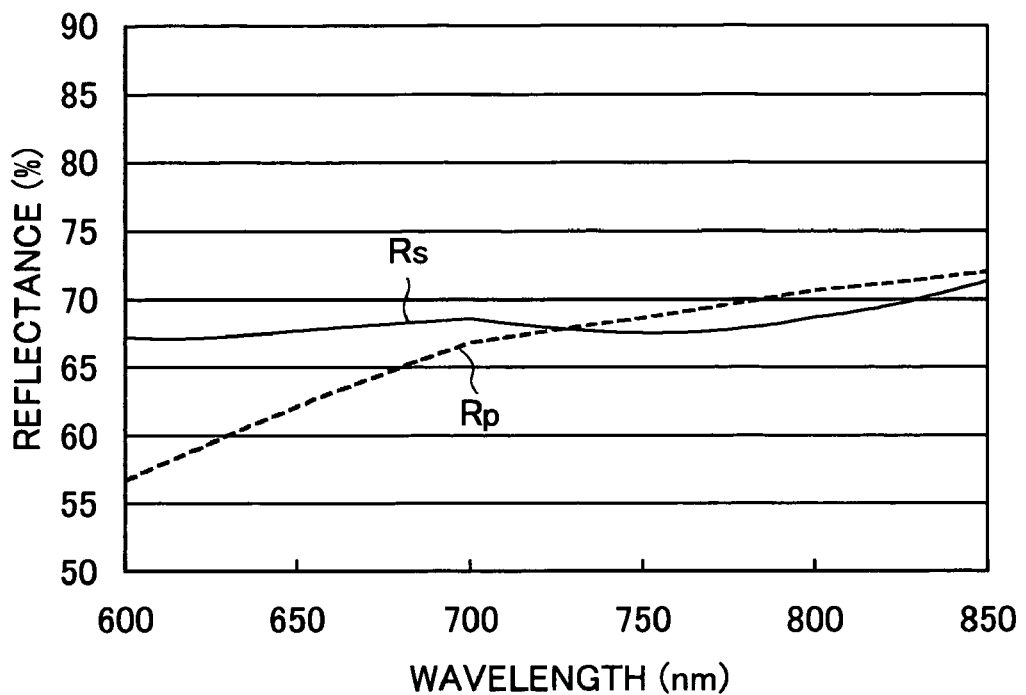
FIG. 22 is a graph showing reflectance of the non-polarizing beam splitter in a eleventh embodiment.
Figure 23:
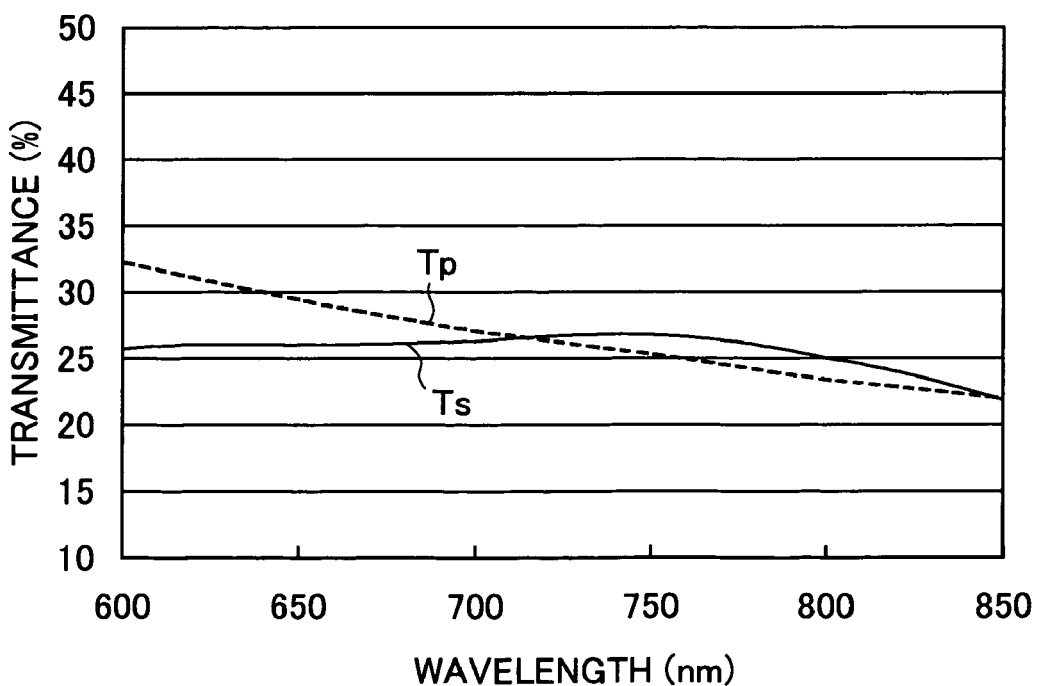
FIG. 23 is a graph showing transmittance of the non-polarizing beam splitter in the eleventh embodiment.
Figure 24:
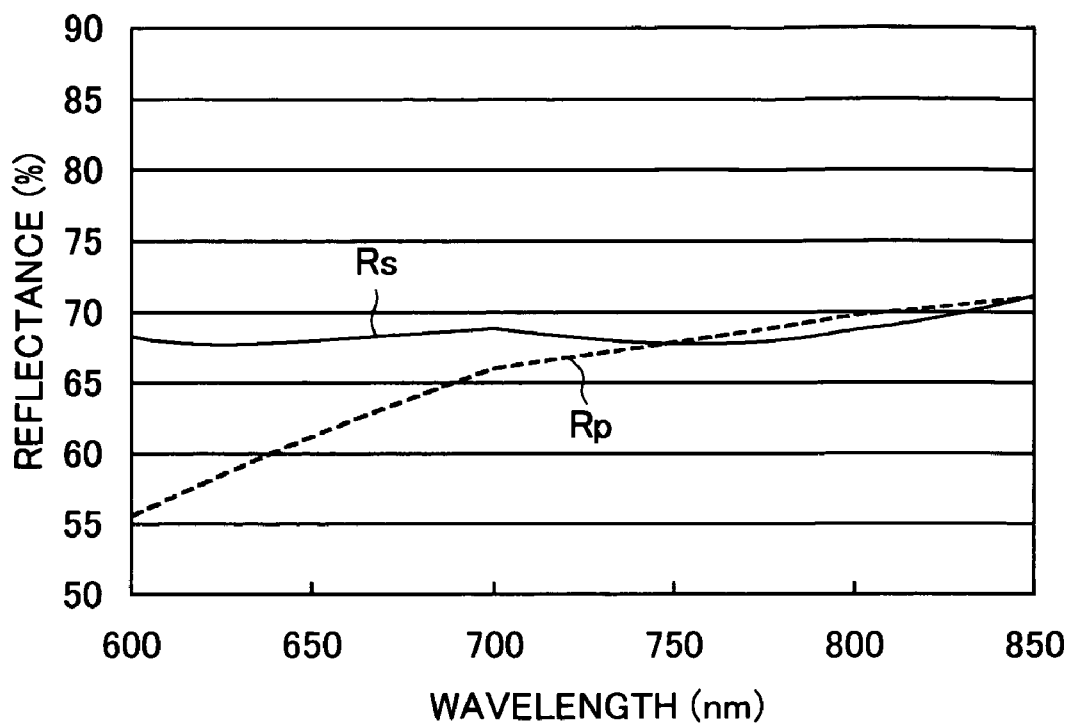
FIG. 24 is a graph showing reflectance of the non-polarizing beam splitter in a twelfth embodiment.
Figure 25:
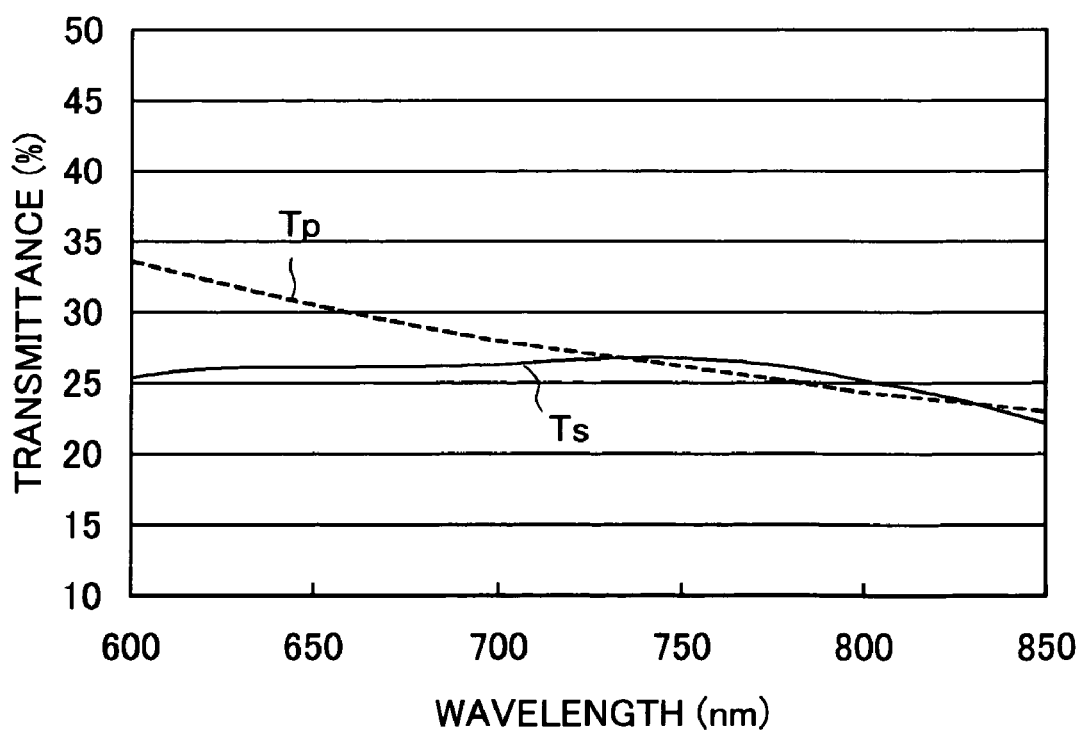
FIG. 25 is a graph showing transmittance of the non-polarizing beam splitter in the twelfth embodiment.
Figure 26:
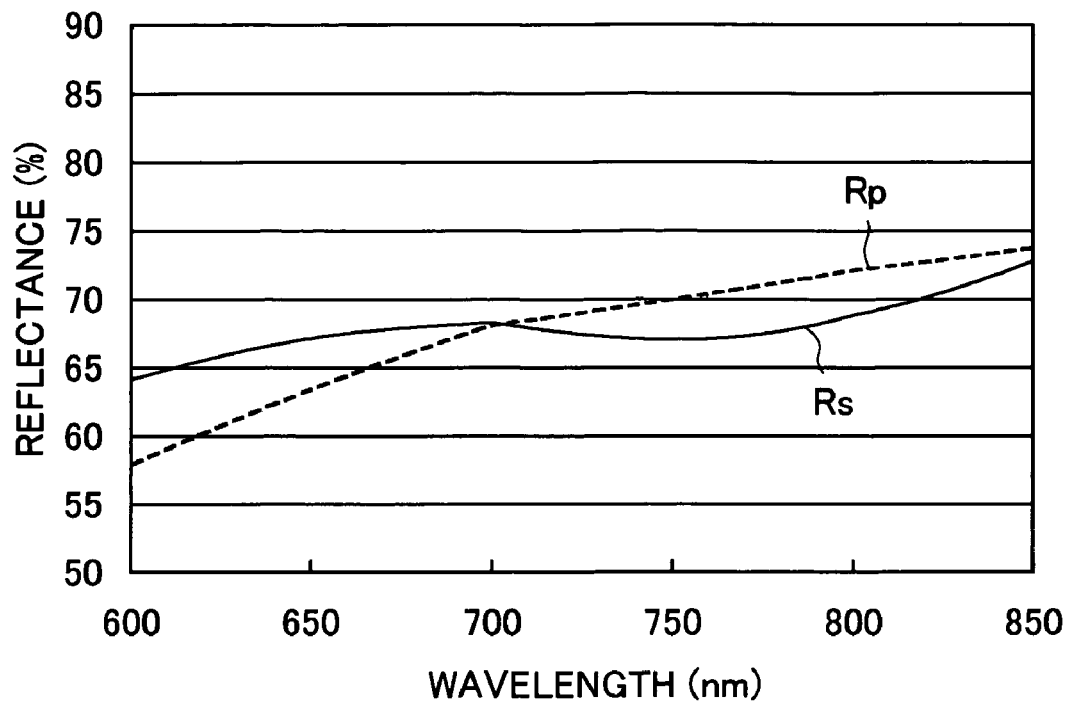
FIG. 26 is a graph showing reflectance of the non-polarizing beam splitter in a thirteenth embodiment.
Figure 27:
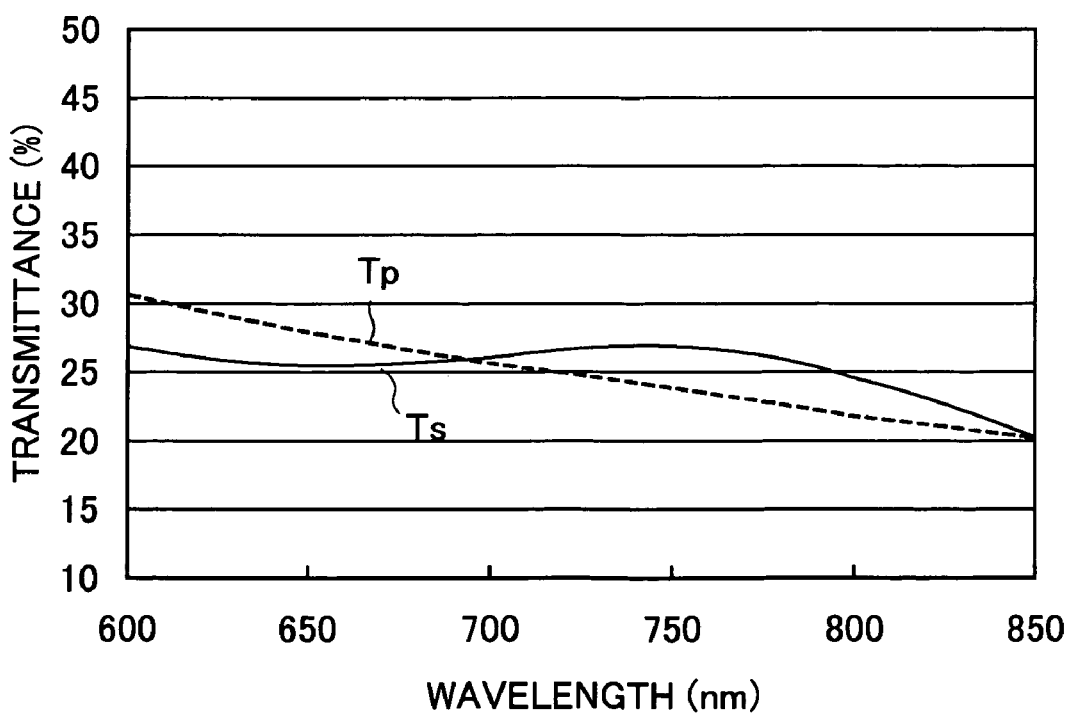
FIG. 27 is a graph showing transmittance of the non-polarizing beam splitter in the thirteenth embodiment.
Figure 28:
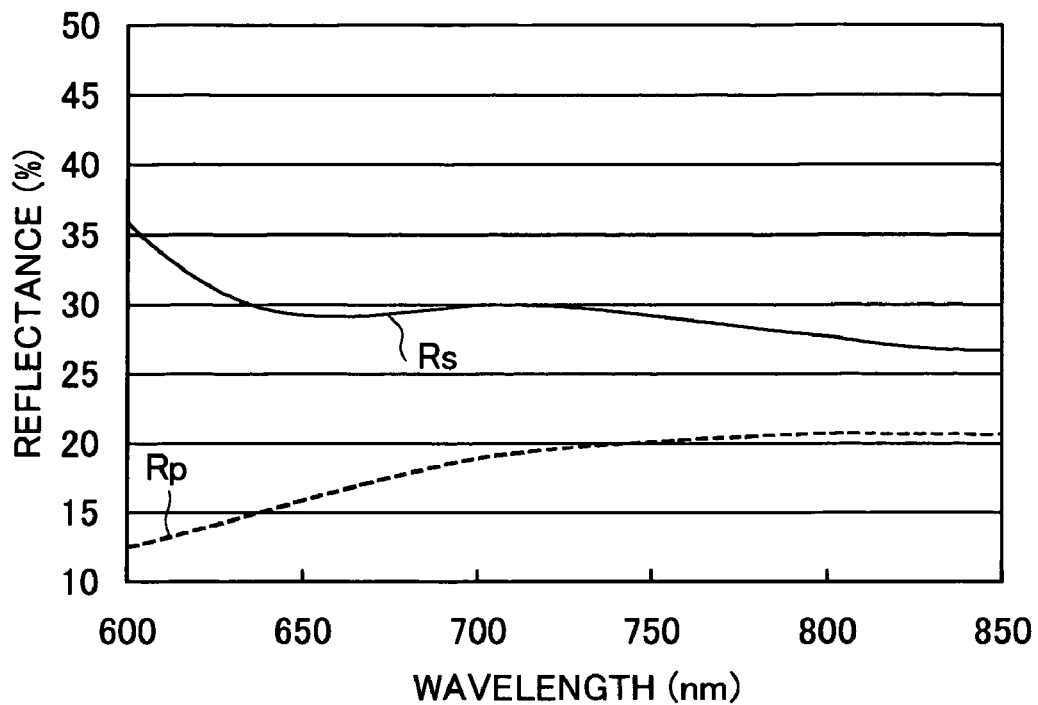
FIG. 28 is a graph showing reflectance of the non-polarizing beam splitter in a comparative example 1.
Figure 29:
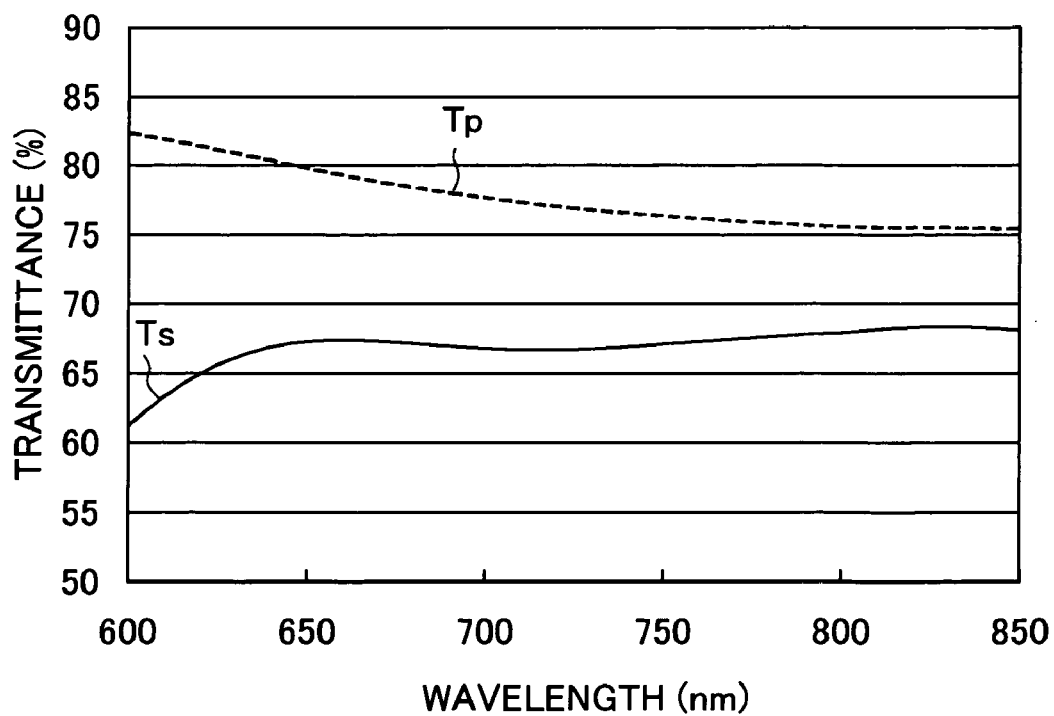
FIG. 29 is a graph showing transmittance of the non-polarizing beam splitter in the comparative example 1.
Figure 30:
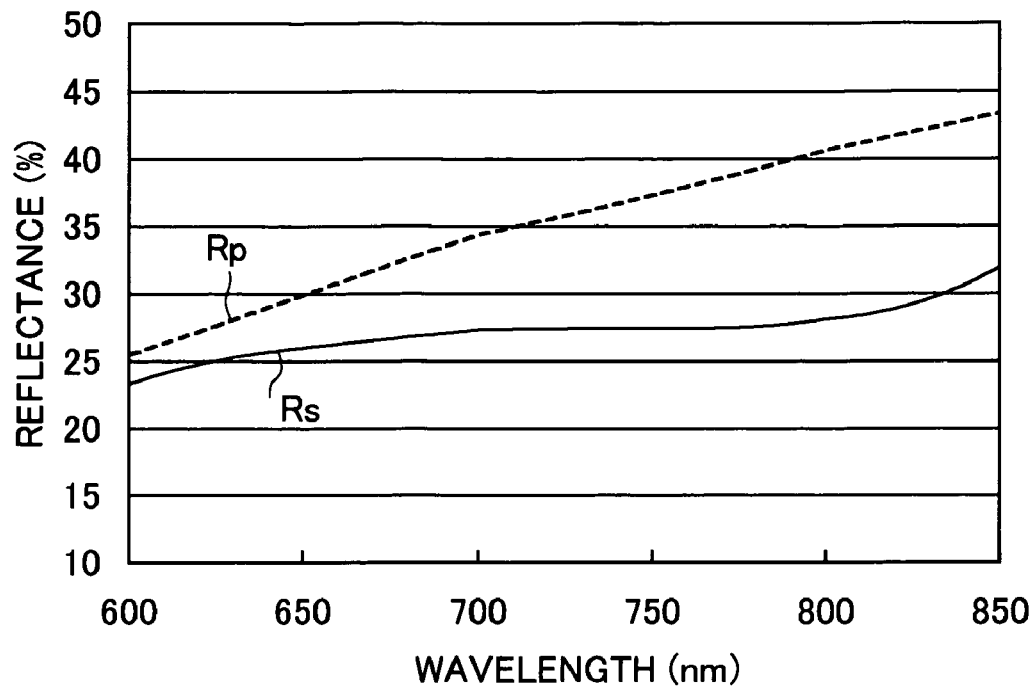
FIG. 30 is a graph showing reflectance of the non-polarizing beam splitter in a comparative example 2.
Figure 31:
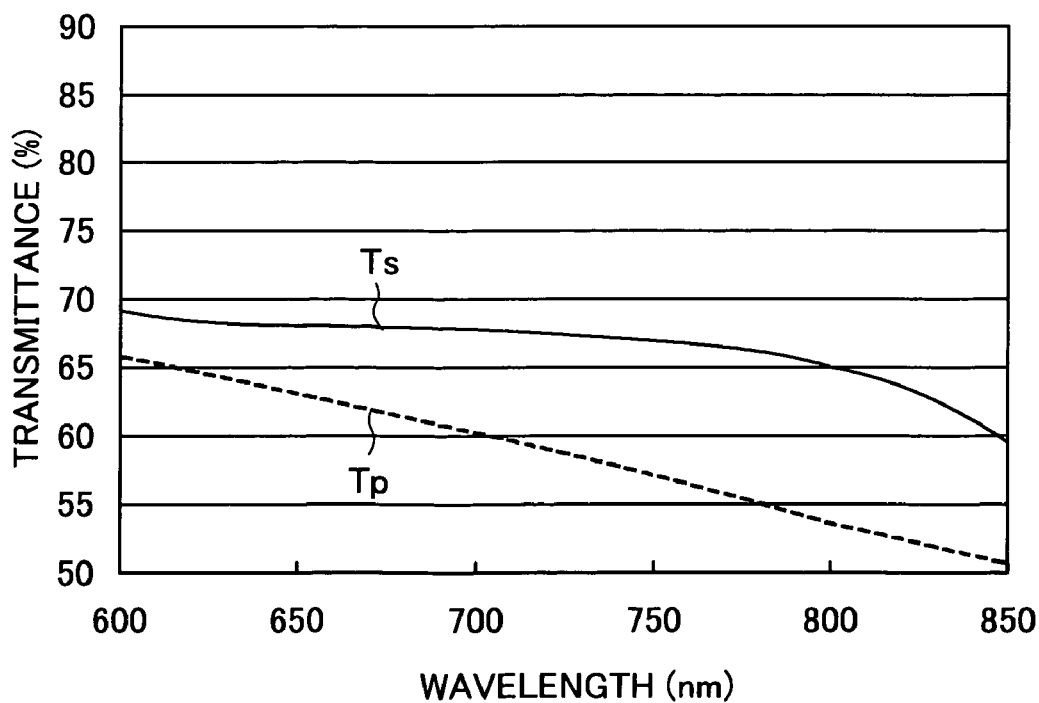
FIG. 31 is a graph showing transmittance of the non-polarizing beam splitter in the comparative example 2.

This non-polarizing beam splitter is designed so that the reflectance and the transmittance of the incident light at wavelength of 640 nm to 820 nm become about 60% and 40%, respectively. FIGS. 20 and 21 show calculated results of the reflectance and the transmittance of the P polarized light and the S polarized light. The layer structure of the tenth embodiment is shown in FIG. 48.

Eleventh to Thirteenth Embodiment

This non-polarizing beam splitter is designed so that the reflectance and the transmittance of the incident light at wavelength of 640 nm to 820 nm become about 70% and 30%, respectively. FIGS. 22 to 27 show calculated results of the reflectance and the transmittance of the P polarized light and the S polarized light. The layer structure of the eleventh to thirteenth embodiments are shown in FIGS. 49 to 51.

COMPARATIVE EXAMPLES 1 AND 2

This non-polarizing beam splitter is designed so that the reflectance and the transmittance of the incident light at wavelength of 640 nm to 820 nm become about 30% and 70%, respectively. FIGS. 28 to 31 show calculated results of the reflectance and the transmittance of the P polarized light and the S polarized light. The layer structure of the comparative examples 1 and 2 are shown in FIGS. 52 and 53, respectively.

COMPARATIVE EXAMPLE 3

Figure 32:
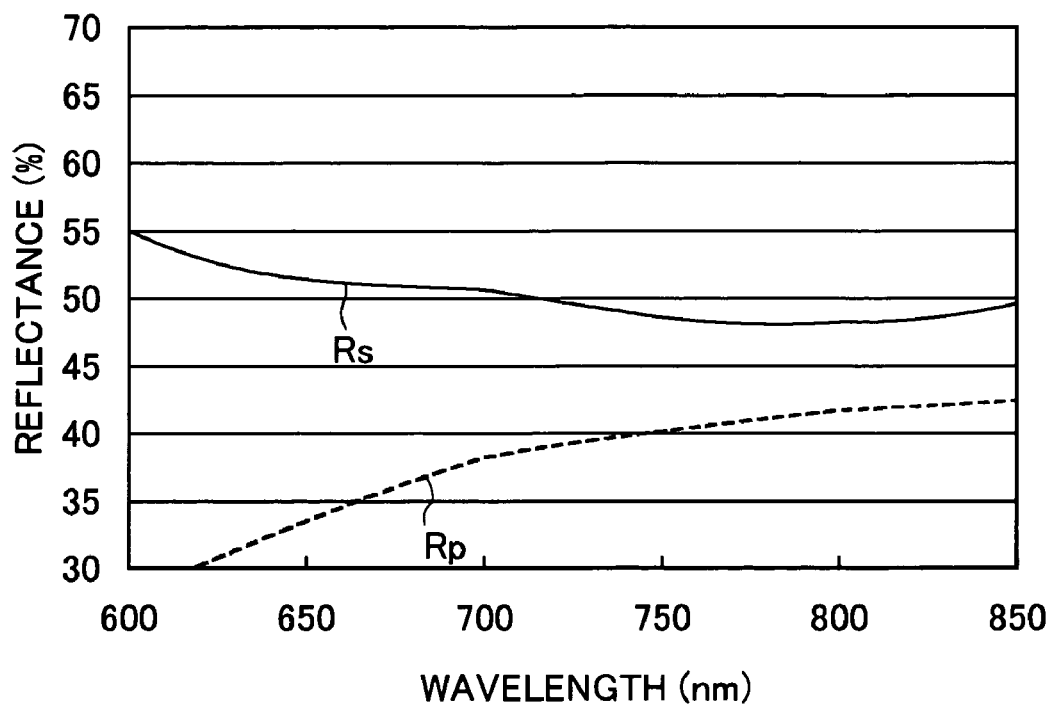
FIG. 32 is a graph showing reflectance of the non-polarizing beam splitter in a comparative example 3.
Figure 33:
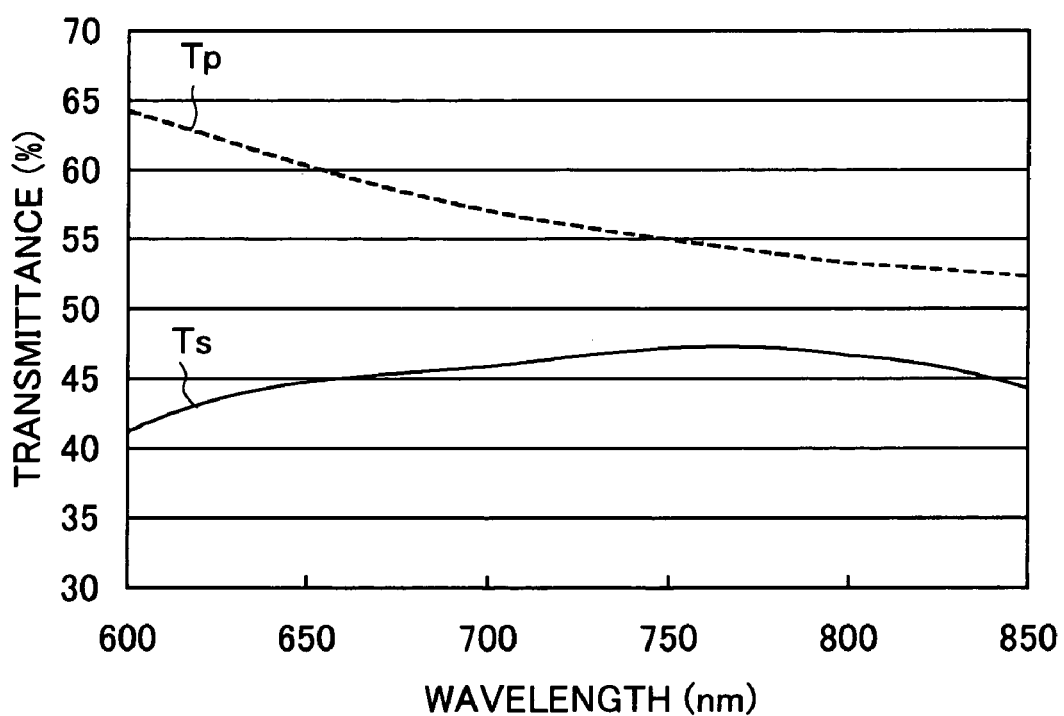
FIG. 33 is a graph showing transmittance of the non-polarizing beam splitter in the comparative example 3.
Figure 34:
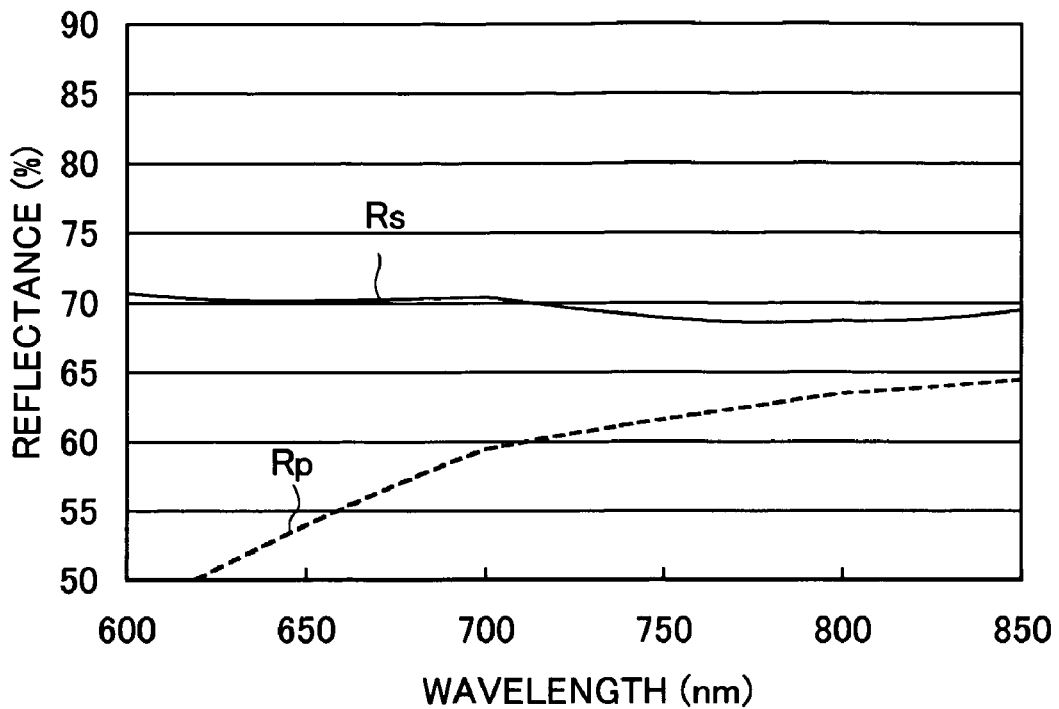
FIG. 34 is a graph showing reflectance of the non-polarizing beam splitter in a comparative example 4.
Figure 35:
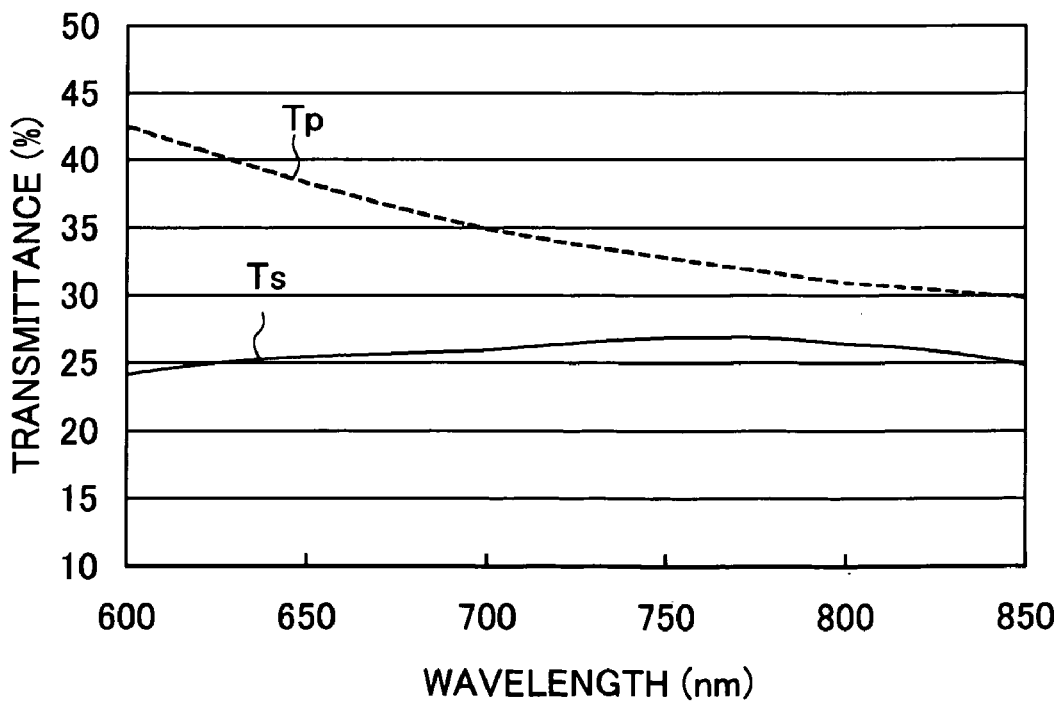
FIG. 35 is a graph showing transmittance of the non-polarizing beam splitter in the comparative example 4.
Figure 36:
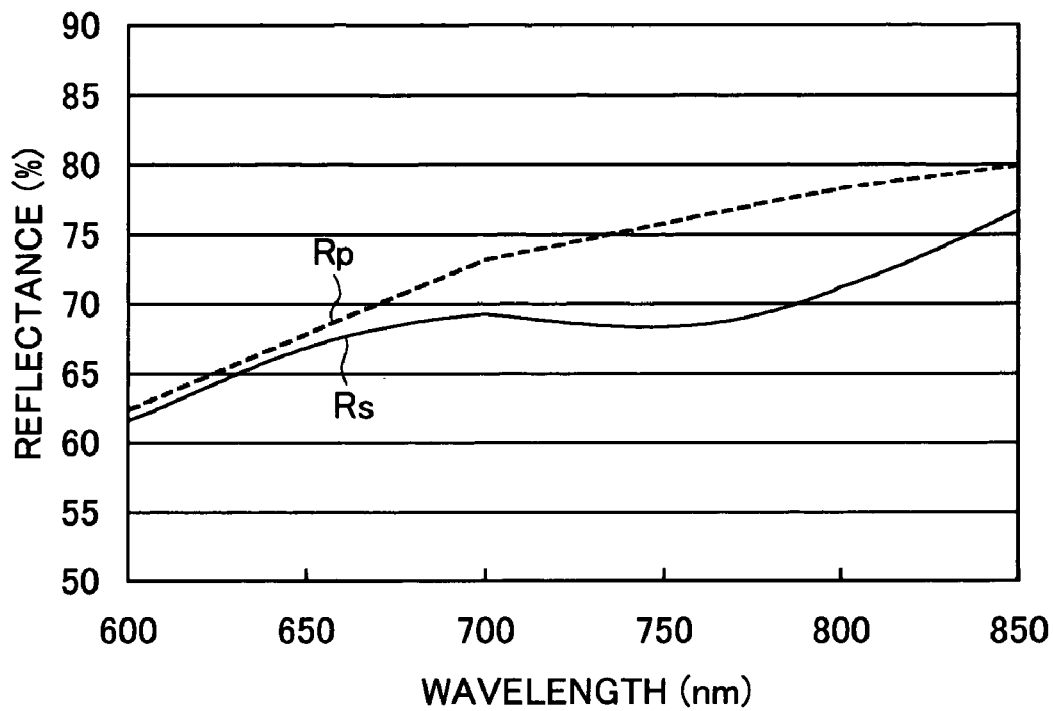
FIG. 36 is a graph showing reflectance of the non-polarizing beam splitter in a comparative example 5.
Figure 37:
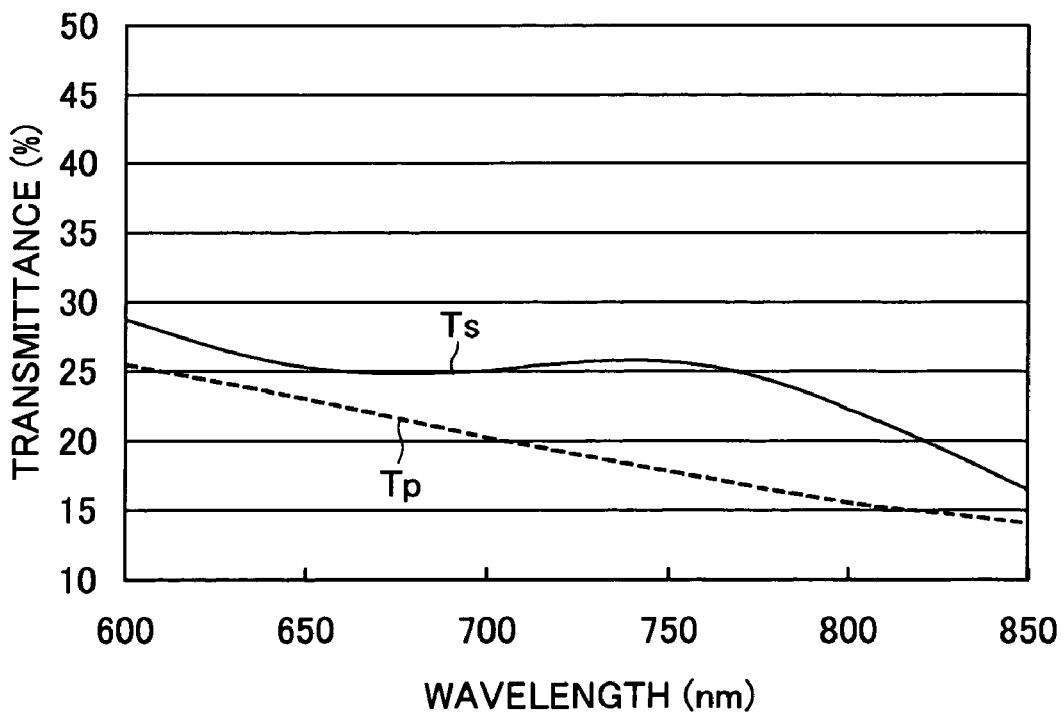
FIG. 37 is a graph showing transmittance of the non-polarizing beam splitter in the comparative example 5.

This non-polarizing beam splitter is designed so that the reflectance and the transmittance of the incident light at wavelength of 640 nm to 820 nm become about 50% and 50%, respectively. FIGS. 32 and 33 show calculated results of the reflectance and the transmittance of the P polarized light and the S polarized light. The layer structure of the comparative example 3 is shown in FIG. 54.

COMPARATIVE EXAMPLES 4 AND 5

This non-polarizing beam splitter is designed so that the reflectance and the transmittance of the incident light at wavelength of 640 nm to 820 nm become about 70% and 30%, respectively. FIGS. 34 to 37 show calculated results of the reflectance and the transmittance of the P polarized light and the S polarized light. The layer structure of the comparative examples 4 and 5 are shown in FIGS. 55 and 56, respectively.

FIGS. 2 to 37 show the reflectance and the transmittance of the P polarized light and the S polarized light at respective wavelengths as the graphs where an abscissa axis represents the wavelength and an ordinate axis represents the reflectance or the transmittance. In the non-polarizing beam splitters in the first to fifth embodiments which are designed so that the reflectance and the transmittance of the incident light at wavelength of 640 nm to 820 nm become about 50% and 50%, respectively, and where the thickness D of the Au layer satisfies the expression (1), as is clear from FIGS. 2 to 11, both the reflectance and the transmittance of the P polarized light and the S polarized light in the wavelength range fall within the range of 47±6% which does not become a practical problem. In addition, even in the case where the incident angle of the light with respect to the Au layer is set to 45°±7°, as shown representatively in FIGS. 4 and 5, the reflectance and the transmittance of the P polarized light and the S polarized light in the wavelength range fall within the range of 45±6%.

In the other embodiments, the reflectance and the transmittance of the P polarized light and the S polarized light in the case where the incident angle of the light with respect to the Au layer is set to 45°±7° are measured or calculated, but the light incident angle is closely related to 45° and thus falls within the range which does not becomes a practical problem. When the data where the light incident angle is 45°±7° are combined with the data of 45° so as to be expressed as one graph, the graph has trouble being seen. For this reason, the data where the light incident angle is 45°±7° are not shown in the graphs of the other embodiments.

Also in the case where the ratio of the reflectance to the transmittance (reflectance ratio) is changed, when the thickness D of the Au layer satisfies the above expression (1), desired reflectance and transmittance are obtained. That is to say, in the non-polarizing beam splitter in the sixth to eighth embodiments which are designed so that the reflectance and the transmittance of the incident light at the above wavelength become about 30% and 70%, respectively, as is clear from FIGS. 12 to 17, both the reflectance and the transmittance of the P polarized light and the S polarized light in the above wavelength range fall within the ranges of 27±6% and 67±6% which do not become a practical problem.

Further, in the non-polarizing beam splitter in the ninth embodiment which is designed so that the reflectance and the transmittance of the incident light in the wavelength range become about 40% and 60%, respectively, as is clear from FIGS. 18 and 19, both the reflectance and the transmittance of the P polarized light and the S polarized light in the wavelength range fall within the ranges of 37±6% and 57±6% which do not become a practical problem.

In the non-polarizing beam splitter in the tenth embodiment which is designed so that the reflectance and the transmittance of the incident light in the wavelength range become about 60% and 40%, respectively, as is clear from FIGS. 20 and 21, both the reflectance and the transmittance of the P polarized light and the S polarized light in the wavelength range fall within the ranges of 57±6% and 37±6% which do not become a practical problem.

In the non-polarizing beam splitter in the eleventh to thirteenth embodiments which are designed so that the reflectance and the transmittance of the incident light in the wavelength range become 70% and 30%, respectively, as is clear from FIGS. 22 to 27, both the reflectance and the transmittance of the P polarized light and the S polarized light in the wavelength range fall within the ranges of 67±6% and 27±6% which do not become a practical problem.

On the contrary, in the case where the thickness D of the Au layer does not satisfy the expression (1), desired reflectance and transmittance cannot be obtained in all the non-polarizing beam splitters. That is to say, in the non-polarizing beam splitters in the comparative examples 1 and 2 corresponding to the sixth embodiment which are designed so that the reflectance and the transmittance become about 30% and 70%, respectively, as is clear from FIGS. 28 to 31, at least one of the reflectance and the transmittance of the P polarized light and the S polarized light is out of the ranges of 27±6% and 67±6% which do not become a practical problem in the above wavelength range.

In the non-polarizing beam splitters in the comparative example 3 corresponding to the first to fifth embodiments which are designed so that the reflectance and the transmittance become about 50% and 50%, respectively, as is clear from FIGS. 32 and 33, at least one of the reflectance and the transmittance of the P polarized light and the S polarized light is out of the range of 47±6% which does not become a practical problem in the above wavelength range.

In the non-polarizing beam splitters in the comparative examples 4 and 5 corresponding to the eleventh to thirteenth embodiments which are designed so that the reflectance and the transmittance become about 70% and 30%, respectively, as is clear from FIGS. 34 to 37, at least one of the reflectance and the transmittance of the P polarized light and the S polarized light is out of the ranges of 67±6% and 27±6% which do not become a practical problem in the above wavelength range.

FIG. 57 is a table showing the thickness D of the Au layer, the average reflectance R of reflectance of P polarized light and reflectance of S polarized light at the wavelengths of 640 nm to 680 nm and 760 nm to 810 nm, the average transmittance T of transmittance of P polarized light and transmittance of S polarized light at the wavelengths of 640 nm to 680 nm and 760 nm to 810 nm, and the reflectance ratio X=R/(R+T), calculated from the above embodiments and the comparative examples. In addition, average reflectance R and average transmittance T are the values at incidence angles of 45°.

FIG. 38 is a graph showing a correlation between the reflectance ratio X and the thickness D of the Au layer obtained from the above embodiments and the comparative examples. In FIG. 38, thirteen embodiments are expressed with white circles "○" and five comparative examples are expressed with black circles "●". Expressions (1) and (1') are expressed with broken line and chain double-dashed line, respectively.

In the non-polarizing beam splitter of the above embodiments, one or more ground layer(s) made of the dielectric material is (are) formed on the slant face of the right angle prism, and the Au layer is formed thereon. For this reason, the degree of the adhesion between the right angle prism and the Au layer is heightened, and thus the peeling of the Au layer is effectively prevented. Since one or more protective layer(s)

made of the dielectric material is (are) formed on the Au layer, the rubbing resistance is improved more remarkably than conventional one. Further, when the thickness of the Au layer is set to 13 nm to 35 nm, absorption of the light in the visible range at wavelength of 640 nm to 820 nm due to the Au layer can be suppressed to 10% or less. The reflectance and the thickness of the Au layer, and the reflectance and the transmittance satisfy the above expressions (1) and (2), so that even the incident light in the visible range can be branched into the transmission light and the reflection light by a desired ratio regardless of the polarized light state. As a result, the non-polarizing beam splitter of embodiments can be used as an optical part of an optical pickup to be mounted to DVD (wavelength: in the vicinity of 650 nm) and CD (wavelength: in the vicinity of 780 nm).

When the protective layer is constituted so that three kinds of layers having different refractive indexes are laminated, the freedom degree of design becomes large, so that the rubbing resistance is further improved. When the layer adjacent to the Au layer in the ground layer and the protective layer is a layer having intermediate refractive index, the adhesion and the rubbing resistance are further improved.

When two or more ground layers are provided, the peeling of the Au layer can be further prevented, and the optical characteristic can be improved.

The total sum of the thickness of the protective layers is 400 nm, the rubbing resistance can be improved.

What is claimed is:

1. A non-polarizing beam splitter comprising:
   a first prism;
   a ground layer made of a dielectric material which is formed on a slant face of the first prism;
   an Au layer having thickness of 15.5 to 35 nm which is formed on the ground layer;
   a protective layer made of a dielectric material which is formed on the Au layer; and
   a second prism which is jointed to an outermost layer of the protective layer via adhesive, wherein the non-polarizing beam splitter divides light at wavelength of 640 nm to 820 nm into transmission light and reflection light by a predetermined ratio, wherein the following conditions are satisfied: $25.2X^2+12.4X+6.84<D<31.6X^2+12.6X+10.4$, $R+T>88$ (%) where, $X=R/(R+T)$ R designates an average of reflectance of P polarized light and reflectance of S polarized light at the wavelengths of 640 nm to 680 nm and 760 nm to 810 nm,
   T designates an average of transmittance of the P polarized light and transmittance of the S polarized light at wavelengths of 640 nm to 680 nm and 760 nm to 810 nm,
   D designates a thickness of the Au layer (nm).

2. The non-polarizing beam splitter according to claim 1, wherein in wavelength ranges of 640 nm to 680 nm and 760 nm to 810 nm, a maximum value of a difference between the reflectance of P polarized light and the reflectance of S polarized light is 10% or less, and a maximum value of a difference between the transmittance of the P polarized light and the transmittance of the S polarized light is 10% or less.

3. The non-polarizing beam splitter according to claim 1, wherein a maximum value of a difference between average reflectance of P polarized light and S polarized light at wavelength of 640 nm to 680 nm and average reflectance of the P polarized light and the S polarized light at wavelength of 760 nm to 810 nm is 10% or less, a maximum value of a difference between average transmittance of the P polarized light and the S polarized light at wavelength of 640 nm to 680 nm and average transmittance of the P polarized light and the S polarized light at wavelength of 760 nm to 810 nm is 10% or less.

4. A non-polarizing beam splitter comprising:
   a first prism;
   a ground layer made of a dielectric material which is formed on a slant face of the first prism;
   an Au layer having thickness of 15.5 to 35 nm which is formed on the ground layer;
   a protective layer made of a dielectric material which is formed on the Au layer; and
   a second prism which is jointed to an outermost layer of the protective layer via adhesive, wherein the non-polarizing beam splitter divides light at wavelength of 640 nm to 820 nm into transmission light and reflection light by a predetermined ratio, wherein the following conditions are satisfied: $28.4X^2+10.6X+7.55<D<25.2X^2+17.1X+8.99$, $R+T>88$(%) where, $X=R/(R+T)$ R designates an average of reflectance of P polarized light and reflectance of S polarized light at the wavelengths of 640 nm to 680 nm and 760 nm to 810 nm,
   T designates an average of transmittance of the P polarized light and transmittance of the S polarized light at wavelengths of 640 nm to 680 nm and 760 nm to 810 nm, D designates a thickness of the Au layer (nm).

5. The non-polarizing beam splitter according to claim 1, wherein the protective layer includes:
   a high refractive index layer having refractive index of 1.8 or more;
   a intermediate refractive index layer having refractive index of 1.5 to 1.8 (not including 1.5 and 1.8); and
   a low refractive index layer having refractive index of 1.5 or less.

6. The non-polarizing beam splitter according to claim 1, wherein the layer adjacent to the Au layer in the ground layer and the protective layer is the intermediate refractive index layer.

7. The non-polarizing beam splitter according to claim 1, wherein total thickness of the protective layer is 400 nm or more.

8. The non-polarizing beam splitter according to claim 1, further comprising six or more additional protective layers.

9. The non-polarizing beam splitter according to claim 1, further comprising one or more additional ground layers.

10. The non-polarizing beam splitter according to claim 1, wherein a maximum value of a difference between average reflectance of the P polarized light and the S polarized light at wavelength of 640 nm to 680 nm and average reflectance of the P polarized light and the S polarized light at wavelength of 760 nm to 810 nm is 10% or less, a maximum value of a difference between average transmittance of the P polarized light and the S polarized light at wavelength of 640 nm to 680 nm and average transmittance of the P polarized light and the S polarized light at wavelength of 760 nm to 810 nm is 10% or less.

11. The non-polarizing beam splitter according to claim 4, wherein a maximum value of a difference between average reflectance of P polarized light and S polarized light at wavelength of 640 nm to 680 nm and average reflectance of P polarized light and S polarized light at wavelength of 760 nm to 810 nm is 10% or less, a maximum value of a difference between average transmittance of the P polarized light and the S polarized light at wavelength of 640 nm to 680 nm and average transmittance of the P polarized light and the S polarized light at wavelength of 760 nm to 810 nm is 10% or less.

12. The non-polarizing beam splitter according to claim 10, further comprising six or more additional protective layers, and further comprising one or more additional ground layers.

13. The non-polarizing beam splitter according to claim 4, wherein in wavelength ranges of 640 nm to 680 nm and 760 nm to 810 nm, a maximum value of a difference between the reflectance of the P polarized light and the reflectance of the S polarized light is 10% or less, and a maximum value of a difference between the transmittance of the P polarized light and the transmittance of the S polarized light is 10% or less.

* * * * *